US012725900B2

(12) United States Patent
Johnson et al.

(10) Patent No.: US 12,725,900 B2
(45) Date of Patent: Sep. 1, 2026

(54) ADDITIVELY MANUFACTURED MONOLITHIC WAVEGUIDE TRANSMISSION LINE WITH STEPPED MODE TRANSITION

(71) Applicant: BAE SYSTEMS Information and Electronic Systems Integration Inc., Nashua, NH (US)

(72) Inventors: Alexander D. Johnson, Waltham, MA (US); Jonathan E. Epstein, Acton, MA (US); Dmytro Volkov, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 322 days.

(21) Appl. No.: 18/414,624

(22) Filed: Jan. 17, 2024

(65) Prior Publication Data

US 2025/0233295 A1 Jul. 17, 2025

(51) Int. Cl.
*H01Q 13/00* (2006.01)
*H01P 5/08* (2006.01)
*H01Q 13/02* (2006.01)

(52) U.S. Cl.
CPC ............... *H01P 5/08* (2013.01); *H01Q 13/02* (2013.01); *H01Q 13/0283* (2013.01)

(58) Field of Classification Search
CPC ....... H01P 5/08; H01Q 13/02; H01Q 13/0283
See application file for complete search history.

(56) References Cited

U.S. PATENT DOCUMENTS 11,804,681 B1 * 10/2023 Shu .......................... H01P 5/103
2007/0229182 A1 * 10/2007 Gaucher ................. H01P 3/003 333/26
2014/0145893 A1 * 5/2014 Park ..................... H01Q 21/064 343/756
2015/0270616 A1 * 9/2015 Jafarlou ................. H01Q 13/02 29/601
2016/0164189 A1 * 6/2016 Jafarlou ................. H01Q 13/02 29/601
2024/0213185 A1 * 6/2024 Jogalekar ................ H01P 5/107

* cited by examiner

*Primary Examiner* — Ping Y Hsieh
(74) *Attorney, Agent, or Firm* — Gary McFaline

(57) ABSTRACT

A monolithic structure with a stepped mode transition. In an example, the monolithic structure includes a waveguide to coaxial transition structure including (i) one or more walls defining a cavity, and having a first opening at one end of the cavity and a second opening at an opposing end of the cavity, (ii) a staircase structure extending within the cavity between the first and second openings, and (iii) a coaxial center conductor extending from a last step of the staircase structure and out the second opening. In an example, the monolithic structure further includes an extension portion extending from below the second opening and under and past an end of the coaxial center conductor. A grounded coplanar waveguide transition board is on a first section of an upper surface of the extension portion, and an amplifier is on a second section of the upper surface of the extension portion.

18 Claims, 13 Drawing Sheets

ADDITIVELY MANUFACTURED MONOLITHIC WAVEGUIDE TRANSMISSION LINE WITH STEPPED MODE TRANSITION

FIELD OF DISCLOSURE

The present disclosure relates to antennas, and more particularly, to a waveguide transmission structure.

BACKGROUND

A waveguide transition structure is a hollow metal pipe, tube, or a cuboid used for transmitting high frequency signals, such as microwave signals and radio frequency (RF) signals. A waveguide transition structure may be used to connect an antenna to the frontend electronics of a given communication system. The electromagnetic waves in a waveguide transition structure travel via a zig-zag path, such as repeatedly being reflected between opposite sidewalls of the waveguide transition structure.

Waveguide transition structures are often used in conjunction with aperture antennas, such as waveguide-fed pyramidal horn antenna. A waveguide aperture or horn antenna (also referred to as microwave horn) comprises a flaring (e.g., gradually becoming wider at one end) conductive material (such as metal), shaped as a waveguide, to direct radio waves in a beam while impedance matching the wave to free space. Waveguide apertures are used as antennas at ultra-high frequencies and microwave frequencies, such as above 300 MHz. In an example, a waveguide transition structure communicates RF signals between an RF frontend and a waveguide aperture. There remain a number of non-trivial challenges with respect to designing and manufacturing communication systems including a waveguide transition structure.

Figure 1:
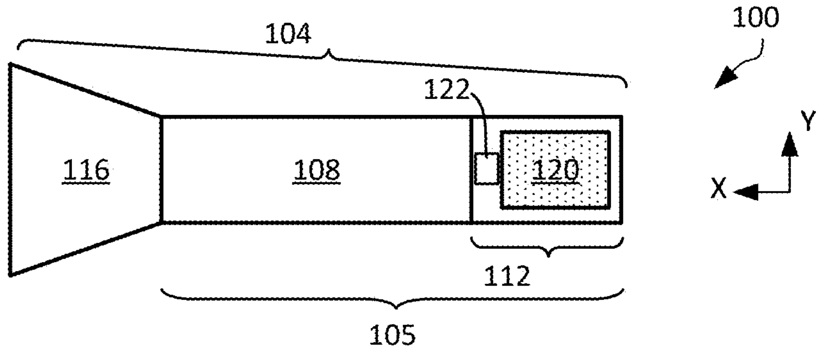
FIGS. 1 and 2 each illustrates a plan view of an antenna system comprising (i) a waveguide to coaxial transition structure configured to transmit or receive a radio frequency signal, (ii) an extension portion extending from an end of the waveguide to coaxial transition structure, and (iii) a waveguide aperture on a second end of the waveguide transmission line, wherein at least the waveguide to coaxial transition structure and the extension portion form a monolithic and continuous conductive structure, and wherein the extension portion is configured for placement of (i) a grounded coplanar waveguide transition board and (ii) an radio frequency (RF) amplifier for amplifying the radio frequency signal transmitted to or received from the waveguide aperture, in accordance with an embodiment of the present disclosure.

Although the following detailed description will proceed with reference being made to illustrative examples, many alternatives, modifications, and variations thereof will be apparent in light of this disclosure.

DETAILED DESCRIPTION

A monolithic waveguide transition structure with a stepped mode transition is described. The structure can be used in any number of applications. In an example, the structure is part of an antenna system. In one such example, an antenna system includes a waveguide to coaxial transition structure that is monolithic with an extension portion, wherein the extension portion has an upper surface that is configured for placement of a grounded coplanar waveguide transition board and an amplifier. The monolithic structure includes a coaxial center conductor that extends from (and may be a part of) the waveguide to coaxial transition structure and contacts the grounded coplanar waveguide transition board, which in turn is connected to the amplifier. In an example, the waveguide mode (e.g., transverse electric or TE10 mode) is being transitioned to a transverse electromagnetic (TEM) coaxial mode within this monolithic structure. The coaxial center conductor contacts the grounded coplanar waveguide transition board for yet another transition between the TEM coaxial mode and a quasi-TEM grounded coplanar waveguide transition board mode. Thus, a continuous, conductive, and monolithic structure includes a waveguide to grounded coplanar waveguide transition structure configured with the conductive coaxial center conductor and the extension portion, which eliminates the need for a separate transition module to connect the waveguide to coaxial transition structure to the grounded coplanar waveguide transition board. Such a configuration may allow for reduced insertion loss between the amplifier and the waveguide to coaxial transition structure, and resultantly increased effective isotropic radiated power (EIRP) for transmit use cases or lower noise figure for receive use cases, relative to a configuration that uses a coaxial cable based interface. In an example, the waveguide to grounded coplanar waveguide transition structure is continuous with, or otherwise attached to, a waveguide aperture.

General Overview

As mentioned herein above, there remain a number of non-trivial challenges with respect to designing and manufacturing communication systems including a waveguide transition structure. For example, an antenna system may include a waveguide transition structure between an amplifier and a waveguide aperture. A coaxial transition module may be used to transmit signals between the amplifier and the waveguide transition structure. Such arrangements may be electrically relatively large and susceptible to relatively high insertion losses between the amplifier and the waveguide transition structure, resulting in reduced EIRP of a transmitting antenna system or a lower noise figure for a receiving antenna system.

Accordingly, techniques are described herein to form a continuous, conductive and monolithic structure comprising a waveguide to coaxial transition structure and an extension portion extending from the waveguide to coaxial transition structure, wherein the extension portion has an upper surface that is configured for placement of an amplifier thereon. In an example, a grounded coplanar waveguide transition board can be used to interface the amplifier with the waveguide to coaxial transition structure. The waveguide to coaxial transition structure and the grounded coplanar waveguide transition board forms a waveguide to grounded coplanar waveguide transition structure. A conductive coaxial signal pin feature (such as a coaxial center conductor) extends from, is continuous with, and a part of the waveguide to coaxial transition structure. The coaxial center conductor extends to a contact pad of the grounded coplanar waveguide transition board, which in turn can be connected to the amplifier. Thus, the amplifier is proximal to the waveguide to grounded coplanar waveguide transition structure, and no separate mode transition modules or coaxial cabling is needed between the amplifier and the waveguide to coaxial transition structure. This reduces an insertion loss between the amplifier and the waveguide to grounded coplanar waveguide transition structure, and resultantly increases the EIRP of corresponding transmitting antenna system or resultantly lowers noise figure for a receiving antenna system.

In an example, the monolithic structure comprising the waveguide to coaxial transition structure and the extension portion is manufactured additively, such as using a three-dimensional (3D) printing process, e.g., a direct metal laser sintering (DMLS) process. Thus, the monolithic structure is a single integral conductive element. For example, a first end of the waveguide to coaxial transition structure is monolithic or otherwise continuous with the extension portion. An opposing second end of the waveguide to coaxial transition structure may be monolithic or otherwise continuous with a waveguide aperture. In other examples, the waveguide aperture can be attached to the waveguide to coaxial transition structure (e.g., via a flange interface arrangement). A waveguide to grounded coplanar waveguide transition structure refers to the monolithic structure comprising the waveguide to coaxial transition structure, and the extension portion on which the amplifier and the grounded coplanar waveguide transition board are placed. A waveguide transition structure refers to the waveguide to coaxial transition structure and/or the waveguide to grounded coplanar waveguide transition structure.

In an example where the waveguide aperture is an antenna that transmits RF signals, the waveguide to grounded coplanar waveguide transition structure transmits the RF signals from an amplifier to the waveguide aperture, and the amplifier may be a high power amplifier generating relatively high power RF signals for transmission by the waveguide aperture. In another example where the waveguide aperture is an antenna that receives RF signals, the waveguide to grounded coplanar waveguide transition structure transmits the RF signals received by the waveguide aperture to an amplifier, and the amplifier may be a low noise amplifier (LNA) amplifying RF signals received by the waveguide aperture. In an example, the amplifier is a monolithic microwave integrated circuit (MMIC), such as a radio frequency integrated circuit (RFIC) chip that operates at microwave frequencies (e.g., 300 MHz to 300 GHz).

As described above, a grounded coplanar waveguide transition board can be used to interface the amplifier to the waveguide to coaxial transition structure. In one such embodiment, the amplifier is on a first section of the upper surface of the extension portion, and the grounded coplanar waveguide transition board is on a second section of the upper surface of the extension portion. In such an example, the grounded coplanar waveguide transition board acts as a connector of RF signals between the amplifier and the waveguide to coaxial transition structure. The waveguide to coaxial transition structure, along with the grounded coplanar waveguide transition board, form the waveguide to grounded coplanar waveguide transition structure.

The grounded coplanar waveguide transition board may include, for example, a ground-signal-ground configuration, which includes a signal conductor between two ground conductors all in the same top plane and a third ground conductor on a bottom plane; other configurations may be used as well. The middle signal conductor may be attached to the amplifier, for example, via a wire bond or conductive run.

In some examples, the waveguide to coaxial transition structure comprises a partially hollow conductive tube or partially hollow conductive cuboid, and includes a cavity there within. For example, the waveguide to coaxial transition structure has opposing sidewalls, an upper wall, and a lower wall. In some such examples, the waveguide to coaxial transition structure further comprises a staircase shaped structure on the lower wall including a plurality of stairs or steps. The staircase shaped structure has a lower end and an upper end, where the stairs rise from the lower end to the upper end. The lower end of the staircase shaped structure faces the waveguide aperture, and the upper end of the staircase shaped structure faces the extension portion. The staircase shaped structure facilitates mode transfer between the grounded coplanar waveguide transition board and the waveguide to coaxial transition structure.

In one embodiment, a conductive coaxial center conductor extends from, and is continuous with, the uppermost stair to above the extension portion, through an opening within a sidewall facing the extension portion. The coaxial center conductor has a rod-like shape, in an example (e.g., similar to the center conductor of a coaxial cable). The coaxial center conductor extends through a via or opening within the sidewall facing the extension portion. The sidewall facing the extension portion has a thickness that is less than a length of the coaxial center conductor. The sidewall forms an outer conductor of a coaxial structure, and the coaxial center conductor forms an inner conductor of the coaxial structure.

In an example, a diameter of the coaxial center conductor can vary along its length, so as to provide a stepped profile for impedance transformations. For example, a diameter of a middle portion of the coaxial center conductor is greater than a diameter of two ends of the coaxial center conductor. The varying diameter of the coaxial center conductor facilitates tuning impedance transfer between the grounded coplanar waveguide transition board and the uppermost stair of the waveguide to coaxial transition structure, in an example.

In one embodiment, one or more hollow channels extend from a first side wall to a second sidewall of the extension portion, and below the section of the upper surface of the extension portion on which the amplifier is placed. During operation of the amplifier, the hollow channels can be used to transmit cooling fluid, to cool the amplifier and carry away heat generated by the amplifier.

In one embodiment, one or more fin or pin structures are on a lower wall of a section of the extension portion on which the amplifier is placed. During operation of the amplifier, the fin or pin structures facilitate cooling of the extension portion, and resultantly the amplifier placed thereon, in an example.

As described, the waveguide to coaxial transition structure (e.g., including the stair-case like structure, a recess within the extension portion, and the conductive coaxial center conductor extending from the uppermost stair) and the extension portion can be additively manufactured in the form of a single integral monolithic structure. In such an example, the additive manufacturing process allows for various dimensions of the various structures to be fine-tuned, so as to achieve desired antenna characteristics, and/or achieve scalability versus frequency. Moreover, such a monolithic structure reduces insertion loss between the amplifier and the waveguide to coaxial transition structure, and resultantly increases the EIRP of corresponding transmit antenna system or lowers noise figure for receive antenna system. Numerous configurations and variations will be apparent in light of this disclosure.

Materials that are “compositionally different” or “compositionally distinct” as used herein refers to two materials that have different chemical compositions. This compositional difference may be, for instance, by virtue of an element that is in one material but not the other (e.g., copper is compositionally different than an alloy of copper), or by way of one material having all the same elements as a second material but at least one of those elements is intentionally provided at a different concentration in one material relative to the other material (e.g., two copper alloys each having copper and tin, but with different percentages of copper, are also compositionally different). If two materials are elementally different, then one of the materials has an element that is not in the other material (e.g., pure copper is elementally different than an alloy of copper).

It should be readily understood that the meaning of “above” and “over” in the present disclosure should be interpreted in the broadest manner such that “above” and “over” not only mean “directly on” something but also include the meaning of over something with an intermediate feature or a layer there between. As will be appreciated, the use of terms like “above” “below” “beneath” “upper” “lower” “top” and “bottom” are used to facilitate discussion and are not intended to implicate a rigid structure or fixed orientation; rather such terms merely indicate spatial relationships when the structure is in a given orientation.

Architecture

FIG. 1 illustrates a plan view of an antenna system 100 comprising (i) a waveguide to coaxial transition structure 108 configured to transmit a radio frequency signal, (ii) an extension portion 112 extending from a first end of the waveguide to coaxial transition structure 108, and (iii) a waveguide aperture 116 on a second end of the waveguide to coaxial transition structure 108, wherein the waveguide to coaxial transition structure 108, the extension portion 112, and the waveguide aperture 116 form a monolithic and continuous conductive structure 104, and wherein the extension portion 112 is configured for placement of an amplifier 120 thereon, for amplifying the radio frequency signal transmitted to or received from the waveguide, in accordance with an embodiment of the present disclosure.

In an example where the waveguide aperture 116 is an antenna that transmits RF signals, the waveguide to coaxial transition structure 108 (also referred to herein simply as structure 108) transmits the RF signals from the amplifier 120 to the waveguide aperture 116 (also referred to herein as aperture 116). In such an example, the amplifier 120 may be a high power amplifier generating relatively high power RF signals for transmission by the waveguide aperture 116.

In another example where the waveguide aperture 116 is an antenna that receives RF signals, the structure 108 transmits the RF signals received by the waveguide aperture 116 to the amplifier 120. In such an example, the amplifier 120 may be a low noise amplifier (LNA) amplifying RF signals received by the waveguide aperture 116. Thus, the antenna system 100 can transmit RF signals and/or receive RF signals.

In an example, the amplifier 120 is a monolithic microwave integrated circuit (MMIC), such as a radio frequency IC (RFIC) chip that operates at microwave frequencies (e.g., 300 MHZ to 300 GHZ). As described above, the amplifier 120 may be a power amplifier or a low noise amplifier, depending on an implementation of the antenna system 100.

In one embodiment, the structure 104 is a monolithic and continuous conductive structure. For example, the structure 104 may be manufactured using an additive manufacturing process, such as a 3D printing process. Because the entire structure 104 is formed using the additive manufacturing process, the structure 104 is a single integrated structure. The structure 104 being a monolithic and continuous structure implies that any section of the structure 104 is conjoined (e.g., physically joined) with any other section of the structure 104 via one or more intervening sections. Thus, the structure 104 is a single integral conductive structure that has been additively manufactured, without any interface or seam between any two portions of the structure 104.

In one embodiment, the extension portion 112 is configured to receive the amplifier 120. For example, the amplifier 120 is placed on an upper surface of the extension portion 112. As described below, the amplifier 120 transmits RF signals to, or receives RF signals from the structure 108. The extension portion 12 is also referred to as an amplifier carrier 112 that is monolithic with the structure 108.

In an example, a grounded coplanar waveguide transition board 122 (also referred to herein as a board 122) is also on the upper surface of the extension portion 112, and laterally between the amplifier 120 and the structure 108. The board 122 acts as a connector of RF signals between the amplifier 120 and the structure 108. The combination of the structure 108 and the extension portion 112, with the board 122 on the extension portion 112, is labelled as 105 in FIG. 1, and is also referred to as a waveguide to grounded coplanar waveguide transition structure 105, as will be described herein below.

Because the extension portion 112 is monolithically integrated with the structure 108, the amplifier 120 is placed in close proximity to the structure 108. This eliminates or at least reduces cables and connectors between the amplifier 120 and the structure 108, and the board 122 on the extension portion 112 acts to connect RF signals between the structure 108 and the amplifier 120. Also, because the extension portion 112 and the structure 108 are monolithic, this reduces resistance between a ground connection of the extension portion 112 and the structure 108 (e.g., due to elimination of any interface there between). Accordingly, insertion loss between the amplifier 120 and the structure 108 is reduced, e.g., compared to a scenario where the amplifier 120 is placed on a unit that is separate from and non-monolithic with the structure 108. Furthermore, because the structure 108 and the aperture 116 of the structure 104 are monolithic, without an interface there between, an insertion loss between the structure 108 and the aperture 116 is also reduced. Reducing insertion loss in turn increases an EIRP of the antenna system 100 for transmit use cases, or lower noise figure for receive use cases.

In one embodiment, the structure 108, the aperture 116, and the extension portion 112 comprise conductive material, such as one or more metals and/or alloys thereof. In an example, the aperture 116 may be any appropriate type of waveguide fed aperture, such as a waveguide fed horn antenna aperture, also referred to as a horn antenna.

Figure 2:
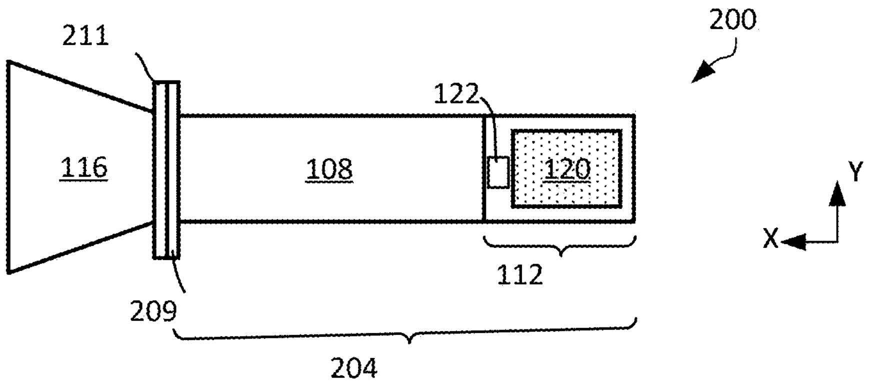

FIG. 2 illustrates a plan view of another antenna system 200 comprising (i) a waveguide to coaxial transition structure 108 (also referred to herein as structure 108) configured to transmit a radio frequency signal, (ii) an extension portion 112 extending from a first end of the waveguide to coaxial transition structure 108, and (iii) a waveguide aperture 116 on a second end of the waveguide to coaxial transition structure 108, wherein the waveguide to coaxial transition structure 108 and the extension portion 112 form a monolithic and continuous conductive structure 204, and wherein the extension portion 112 is configured for placement of an amplifier 120 thereon, for amplifying the radio frequency signal transmitted to or received from the waveguide, in accordance with an embodiment of the present disclosure. Similar components in FIGS. 1 and 2 are labeled using the same label (e.g., waveguide to coaxial transition structure 108, extension portion 120, waveguide aperture 116, grounded coplanar waveguide transition board 122, and the amplifier 120 in both FIGS. 1 and 2 are labelled using the same labels).

Thus, the monolithic structure 104 of FIG. 1 includes the structure 108, the extension portion 112, and the waveguide aperture 116. In contrast, the monolithic structure 204 of FIG. 2 includes the structure 108 and the extension portion 112. The aperture 116 of FIG. 2 is not monolithic with the structure 108. Rather, the aperture 116 of FIG. 2 is connected to the structure 108 through flanges 209 and 211. The structure 204 is also referred to herein as a waveguide to grounded coplanar waveguide transition structure 204.

For example, the flange 209 is monolithic with the structure 108. The flange 211 is monolithic with the aperture 116, in an example. The flanges 211 and 209 are mechanically attached to each other via an appropriate attachment arrangement, such as one or more screws, or one or more nuts and bolts, for example. Further detail of the antenna system 200 of FIG. 2 will be apparent, based on the above description with respect to the antenna system 100 of FIG. 1.

Figure 3A:
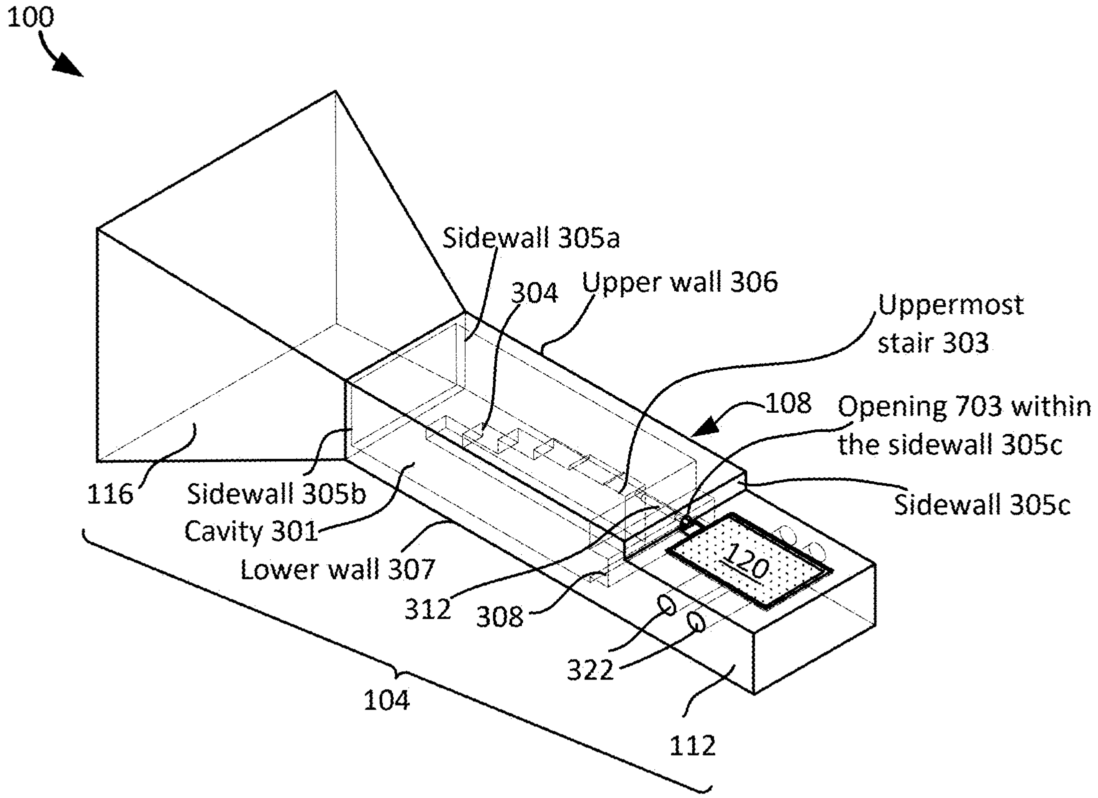
FIG. 3A illustrates a perspective view depicting further detail of the antenna system of FIG. 1, in accordance with an embodiment of the present disclosure.
Figure 3B:
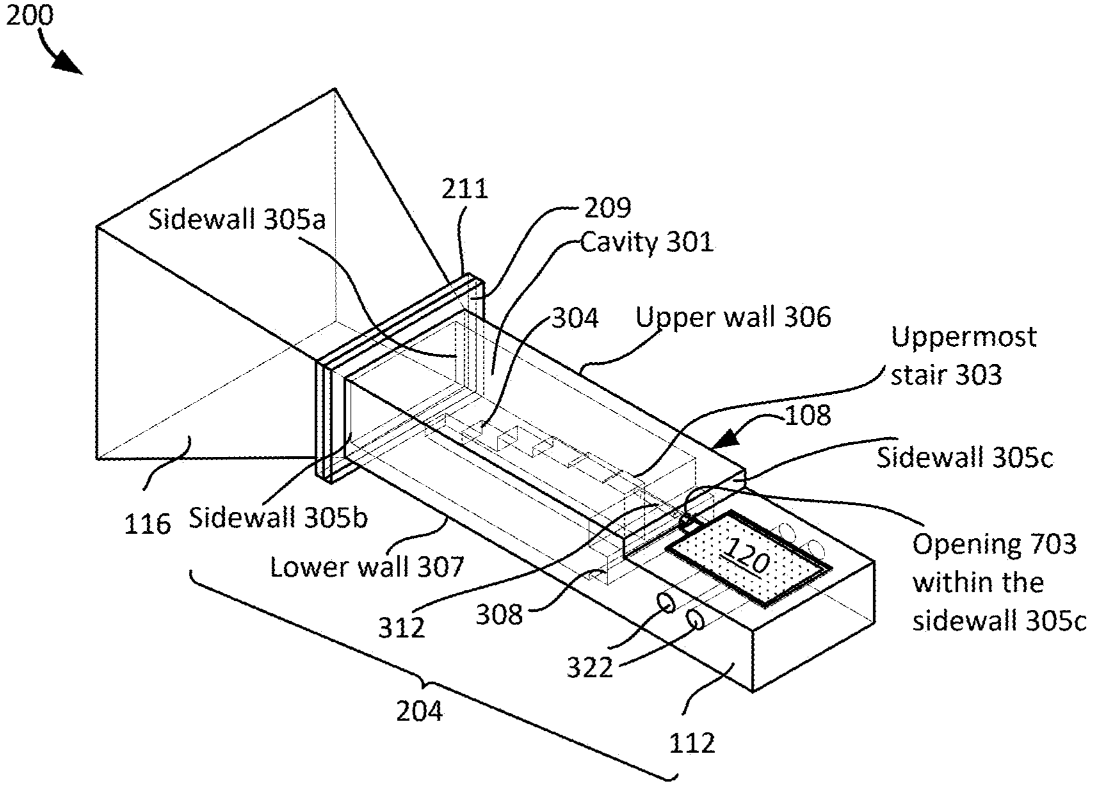
FIG. 3B illustrates a perspective view depicting further detail of the antenna system of FIG. 2, in accordance with an embodiment of the present disclosure.
Figure 4A:
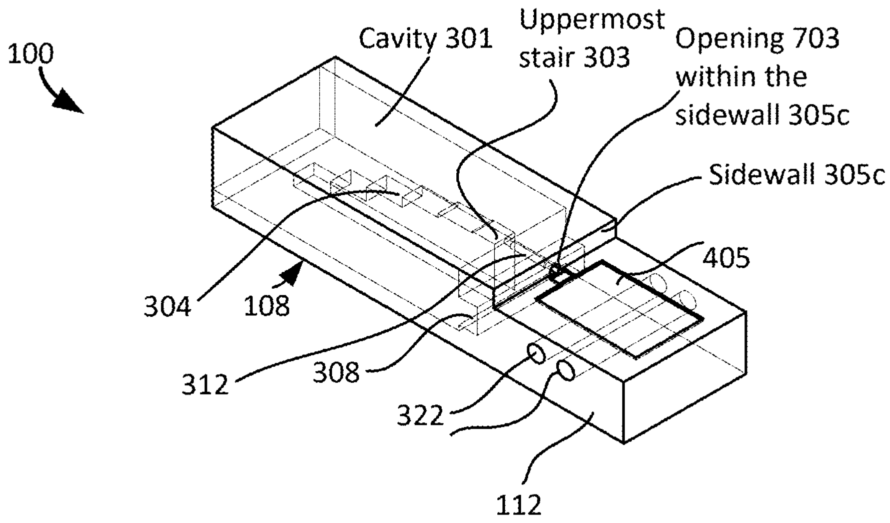
FIG. 4A illustrates a perspective view of the waveguide to coaxial transition structure and the extension portion of the antenna system of FIG. 1, in accordance with an embodiment of the present disclosure.
Figure 4B:
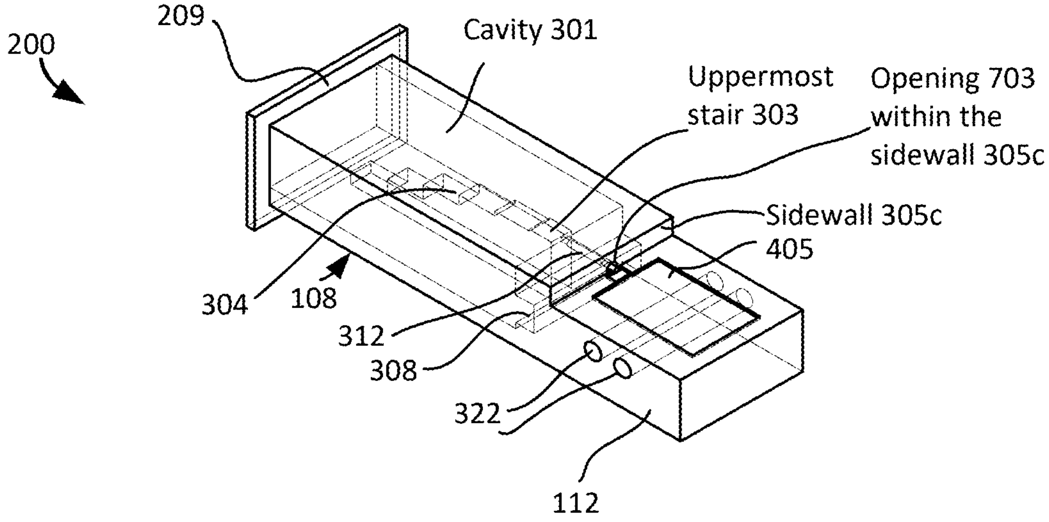
FIG. 4B illustrates a perspective view of the waveguide to coaxial transition structure and the extension portion of the antenna system of FIG. 2, in accordance with an embodiment of the present disclosure.
Figure 5A:
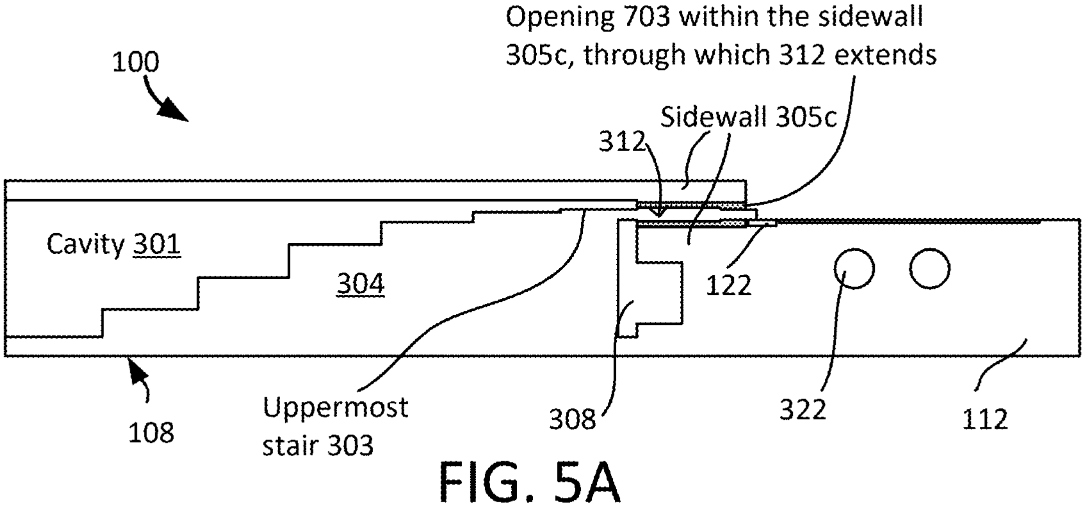
FIG. 5A illustrates a cross-sectional view of the waveguide to coaxial transition structure and the extension portion of the antenna system of FIG. 1, in accordance with an embodiment of the present disclosure.
Figure 5B:
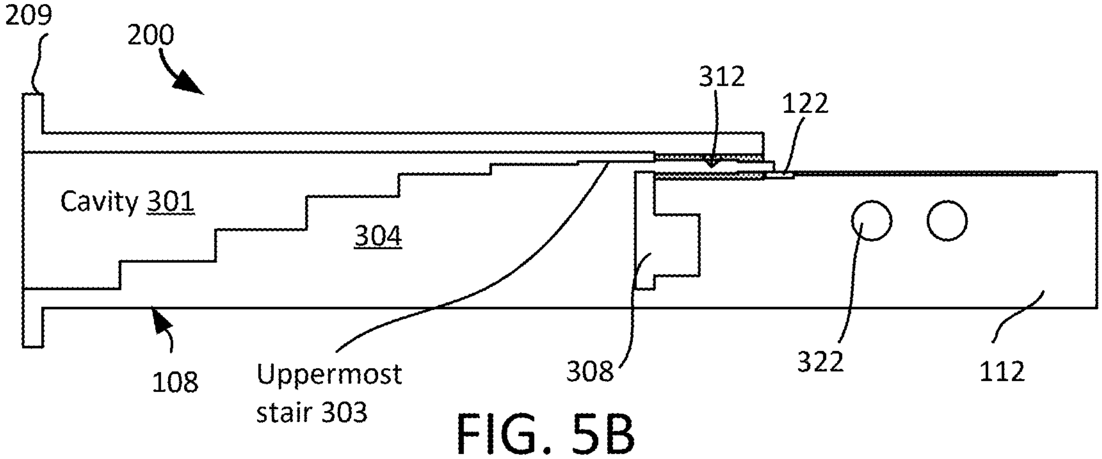
FIG. 5B illustrates a cross-sectional view of the waveguide to coaxial transition structure and the extension portion of the antenna system of FIG. 2, in accordance with an embodiment of the present disclosure.

FIGS. 3A, 3B, 4A, 4B, 5A, 5B, 6A, and 6B illustrate further detail of the antenna systems 100 and 200 of FIGS. 1 and 2, respectively, in accordance with an embodiment of the present disclosure. These figures are described in unison. For example, FIG. 3A illustrates a perspective view depicting further detail of the antenna system 100 of FIG. 1, in accordance with an embodiment of the present disclosure. FIG. 3B illustrates a perspective view depicting further detail of the antenna system 200 of FIG. 2, in accordance with an embodiment of the present disclosure. FIG. 4A illustrates a perspective view of the structure 108 and the extension portion 112 of the antenna system 100 of FIG. 1, in accordance with an embodiment of the present disclosure. FIG. 4B illustrates a perspective view of the structure 108 and the extension portion 112 of the antenna system 200 of FIG. 2, in accordance with an embodiment of the present disclosure. FIG. 5A illustrates a cross-sectional view of the structure 108 and the extension portion 112 of the antenna system 100 of FIG. 1, in accordance with an embodiment of the present disclosure. FIG. 5B illustrates a cross-sectional view of the structure 108 and the extension portion 112 of the antenna system 200 of FIG. 2, in accordance with an embodiment of the present disclosure.

Note that as described above with respect to FIGS. 1 and 2, in the antenna system 100 of FIG. 1, the aperture 116 is monolithic with the structure 108; whereas in the antenna system 200 of FIG. 2, the aperture 116 is attached to the structure 108 via flanges 209, 211. Accordingly, FIGS. 3A, 4A, and 5A doesn't include any flange attached to the structure 108. In contrast, in FIGS. 3B, 4B, and 5B, a flange 209 is attached to the structure 108.

Figure 6A:
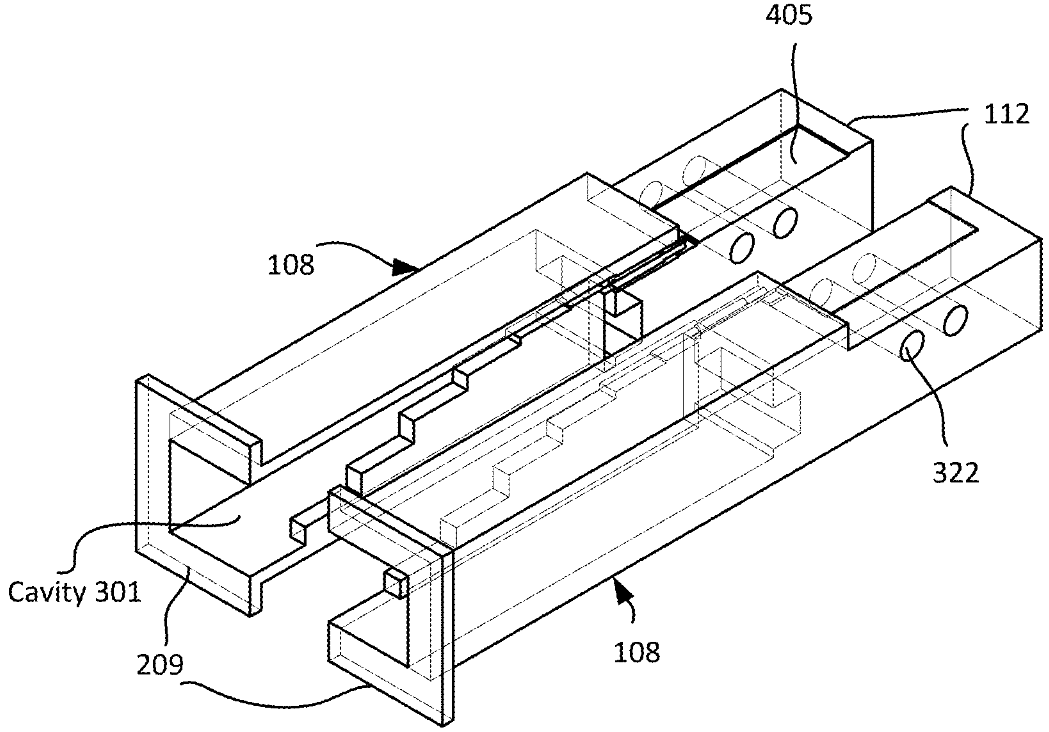
FIGS. 6A-6B illustrate cut-away perspective views of the waveguide to coaxial transition structure and the extension portion of the antenna system of FIG. 2, in accordance with an embodiment of the present disclosure.
Figure 6B:
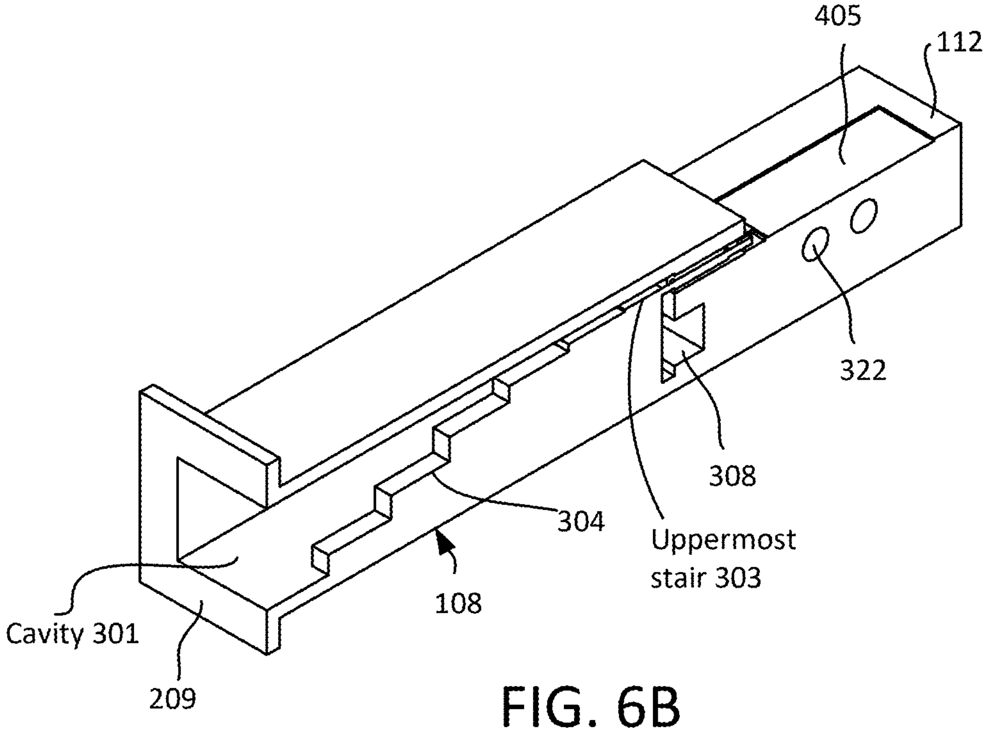

Finally, FIG. 6A illustrates a cut away perspective view of the structure 108 and the extension portion 112 of the antenna system 200 of FIG. 2, in accordance with an embodiment of the present disclosure. FIG. 6B illustrates a perspective view of a portion of the cut away perspective view of structure 108 and the extension portion 112 of FIG. 6A, in accordance with an embodiment of the present disclosure. Note that the teachings of FIGS. 6A and 6B, which include the flange 209 of the antenna system 200, can also be applied to the antenna system 100 lacking the flange.

In FIGS. 3A, 3B, 4A, 4B, 5A, 5B, 6A, and 6B (collectively referred to as FIGS. 3A-6B), same elements are labelled using the same labels. Note that the structure 108 of FIGS. 1 and 2 have similar structure (such as the same internal structure), except for the fact that in FIG. 1, an end of the structure 108 is continuous or otherwise monolithic with the aperture 116 (e.g., 108 and 116 are formed together as a unitary mass of conductive material, via a 3D printing process), whereas the end of the structure 108 of FIG. 2 comprises the flange 209 which is configured to be connected (e.g., welded, bolted, or otherwise fastened) to the corresponding flange 211 of the separately manufactured aperture 116.

Referring now to FIGS. 3A-6B, the structure 108 comprises a partially hollow conductive tube or partially hollow conductive cuboid, and includes a cavity there within. For example, the structure 108 has two opposing sidewalls 305*a*, 305*b*, another sidewall 305*c* facing the extension portion 112, an upper wall 306, and a lower wall 307. The various walls of the structure 108 are labelled in FIGS. 3A and 3B, and some of the walls are not labelled in FIGS. 4A-6B (although are illustrated in FIGS. 4A-6B). The sidewalls 305*a*, 305*b*, 305*c*, the upper wall 306, and the lower wall 307 define a cavity 301 of the structure 108, as illustrated in FIGS. 3A-6B. The structure 108, including the various walls 305*a*, 305*b*, 305*c*, 306, and 307 (and other features of the structure 108 described below), comprise conductive material, such as one or more metals and/or alloys thereof.

As illustrated, one end of the structure 108 is monolithic and continuous with the extension portion 112, and another end of the structure 108 is monolithic and continuous with the flange 209 (such as in FIGS. 3B, 4B, 5B, and 6A, 6B), or monolithic and continuous with the aperture 116 (such as FIG. 3A). The structure 108 further comprises a staircase shaped structure 304 on the lower wall 307. For example, around six stairs are illustrated in some of FIGS. 3A-6B, although any other number of stairs may be present. In an example, during operation, the staircase shaped structure 304 facilitates mode transfer between the board 122 to the propagation mode of the structure 108.

The staircase shaped structure 304 (also referred to herein as structure 304) has a lower end and an upper end, where the stairs rise from the lower end to the upper end. The lower end of the structure 304 faces the aperture 116, and the upper end of the structure 304 faces the extension portion 112, in an example. The structure 304 is a part of the structure 108, and is monolithically integrated and continuous with the lower wall 307. Similar to the walls 305*a*, 305*b*, 305*c*, 306, 307, the structure 304 (e.g., the stairs of the structure 304) comprises one or more metals and/or alloys thereof.

An uppermost stair of the structure 304 is labelled as uppermost stair 303 in various figures. As illustrated in FIGS. 3A-6B, the uppermost stair 303 is nearer to the extension portion 112 than to the aperture 116. For example, a lateral distance between the uppermost stair 303 and the extension portion 112 is less than another lateral distance between a lowermost stair of the structure 304 and the extension portion 112.

In an example, the uppermost stair 303 may not touch the upper wall 306 of the structure 108, and there is a gap between the uppermost stair 303 and the upper wall 306. Similarly, the uppermost stair 303 may not touch the sidewall 305*c* of the structure 108, and there is a gap between the uppermost stair 303 and the sidewall 305*c*. In an example, a coaxial center conductor 312 extends from the uppermost stair 303 to above the extension portion 112, as described below.

In an example, the structure 108 includes a recess 308, which is a hollow portion within the extension portion 112 adjacent to the sidewall 305*c*, and which is between the staircase shaped structure 304 and the extension portion 112. The recess 308 is illustrated in FIGS. 3A-7, such as in FIG. 6B. The recess 308 extends along a width of the structure 108 (where the width of the structure 108 is perpendicular to a length of the structure 108 that extends from the extension portion 112 to the aperture 116). The recess 308 is also referred to as a waveguide backshort. In an example, during operation, the staircase shaped structure 304 and the recess 308 facilitate in mode transfer between the board 122 to the propagation mode of the structure 108.

Figure 7A:
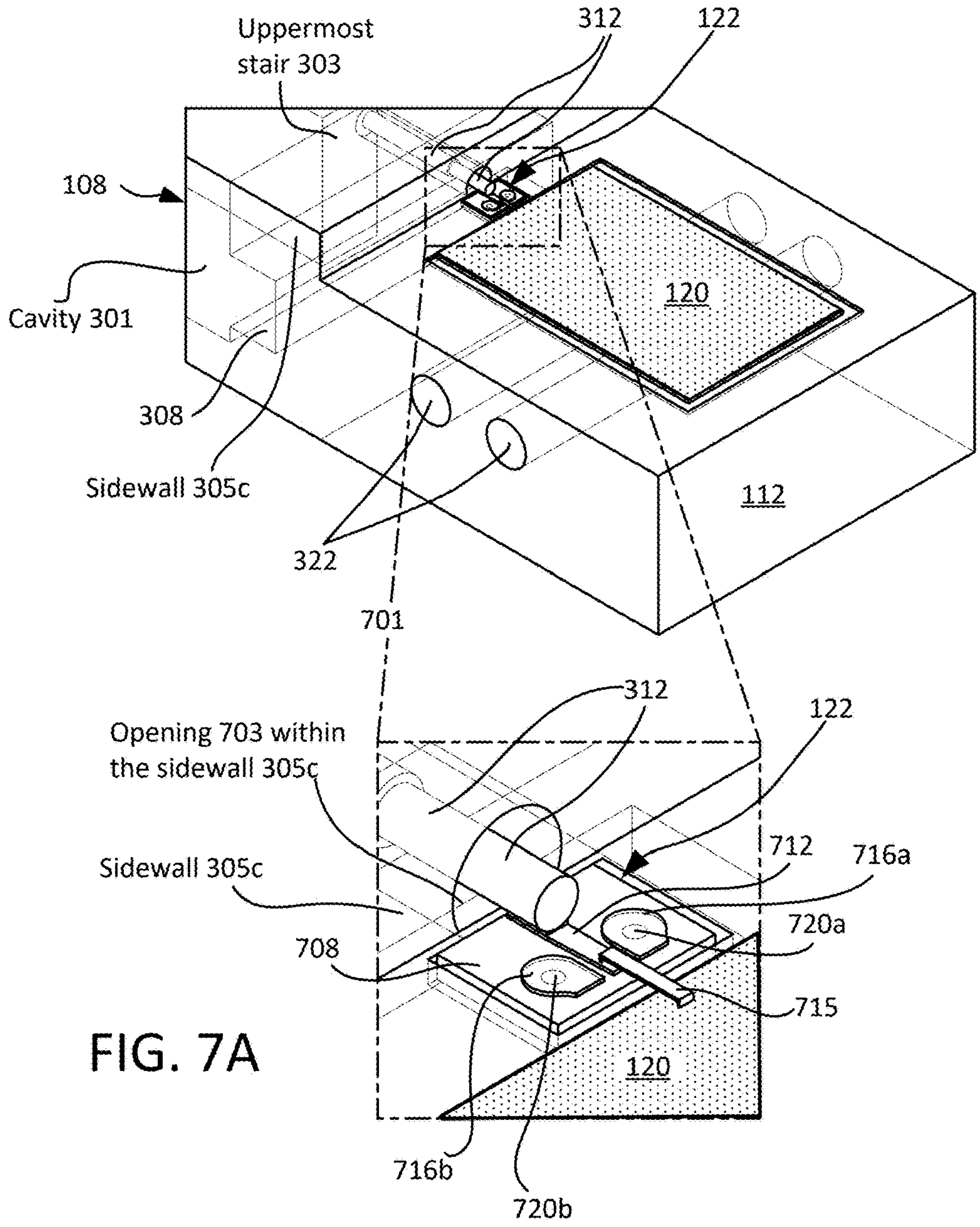
FIG. 7A illustrates a perspective view of an interface between a coaxial center conductor of the waveguide to coaxial transition structure and a grounded coplanar waveguide transition board populated on the extension portion of any of the antenna systems of FIGS. 1-6B, in accordance with an embodiment of the present disclosure.
Figure 7B:
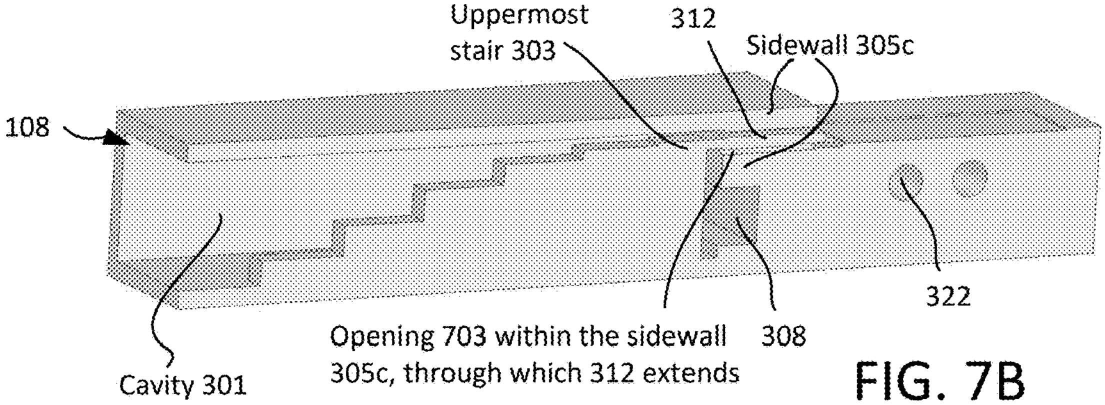
FIG. 7B illustrates a cut away perspective view of the waveguide to coaxial transition structure of any of the antenna systems of FIGS. 1-7A, and further illustrates an opening within a sidewall of the waveguide to coaxial transition structure, wherein a conductive coaxial center conductor extends through the opening without making contact with the opening, in accordance with an embodiment of the present disclosure.

FIG. 7A illustrates a perspective view of an extension portion 112, and also illustrates a conductive coaxial center conductor 312 (also referred to herein as a conductive coaxial signal pin feature) between an uppermost stair 303 and the extension portion 112 of any of the antenna systems 100 or 200 of FIGS. 1-6B, in accordance with an embodiment of the present disclosure. FIG. 7A also illustrates a magnified view of a section 701 of the antenna system. FIG. 7B illustrates a cut away perspective view of the structure 108 and the extension portion 112 of the antenna system 200 of FIG. 1, and further illustrates the opening 703 within the sidewall 305*c* of the structure 108, wherein the conductive coaxial center conductor 312 extends through the opening 703 without making contact with the opening 703, in accordance with an embodiment of the present disclosure.

As illustrated in FIGS. 3A-7B, the coaxial center conductor 312 (described in further detail below with respect to FIG. 8) extends from the uppermost stair 303 to above the extension portion 112, through an opening 703 within the sidewall 305*c*, where the sidewall 305*c* of the structure 108 faces the extension portion 112 (the magnified view of FIG. 7A and FIG. 7B better illustrate the opening 703). The coaxial center conductor 312 is monolithic and continuous with the uppermost stair 303. The coaxial center conductor 312 extends through the opening 703, without making contact with the sidewall 305*c*. The coaxial center conductor 312 has a rod-like shape, having a first end monolithic and continuous with the uppermost stair 303, and a second end extending above the extension 112, where the rod-like structure extends through the opening 703 of the sidewall 305*c*.

The sidewall 305*c* acts as an outer conductor of a coaxial structure, the coaxial center conductor 312 acts as an inner conductor of the coaxial structure, and the air gap within the opening 703 acts as a dielectric material or insulator between the inner and outer conductors of the coaxial structure. Thus, the sidewall 305*c*, the coaxial center conductor 312, and the opening 703, in combination, form a coaxial structure between the structure 108 and the board 122. Note that the portion of the wall of the structure 108 above the opening 703 is referred to as a portion of the sidewall 305*c*-however, such as portion of the wall may also be considered to be a part of the upper wall 306.

In one embodiment, a grounded coplanar waveguide transition board 122 (scc FIG. 7A, also referred to as board 122) is formed above the extension portion 112, e.g., between the amplifier 120 and the structure 108. Note that the board 122 may not be monolithic with the structure 108 and the extension portion 112, and may be placed on the extension portion 112.

The board 122 includes a substrate 708 (see the magnified view in FIG. 7A), where the substrate 708 comprises a dielectric material. For example, the amplifier 120 is above a first section of an upper surface of the extension portion 112, and the substrate 708 is on a second section of the upper surface of the extension portion 112, where the second section of the extension portion 112 is between the first section of the extension portion 112 and the sidewall 305*c* of the structure 108. In an example, a first end of an upper surface of the board 122 is flush or coplanar with a lower surface of the coaxial center conductor 312, and a second end of the upper surface of the board 122 is flush or coplanar with an upper surface of the amplifier 120.

The board 122 comprises a signal conductor 712 (e.g., comprising one or more metals and/or alloys thereof). The substrate 708 comprising dielectric material has the signal conductor 712 thereon, where the signal conductor 712 is a conductive line on the substrate 708. The rod-shaped coaxial center conductor 312 is in contact with an end of the signal conductor 712. In an example, an end of the coaxial center conductor 312 is soldered to the signal conductor 712. Thus, the end of the coaxial center conductor 312 is above and on (or otherwise electrically coupled to) the signal conductor 712.

The board 122 further comprises another interconnect feature 715 (e.g., comprising one or more metals and/or alloys thereof) that is in contact with the amplifier 120 and the signal conductor 712. The interconnect feature 715 is at least in part on and above the substrate 708. A first end of the interconnect feature 715 is in contact with the signal conductor 712, and a second end of the interconnect feature 715 is bonded to (e.g., in contact with) the amplifier 120. In an example, the interconnect feature 715 is a wire bond conductive ribbon comprising one or more metals and/or alloys thereof. The coaxial center conductor 312 receives RF signals from and/or transmits RF signals to the amplifier 120, through the signal conductors 715 and 712. The signal conductors 715 and/or 712 form a contact pad for the coaxial center conductor 312.

The board 122 further comprises two conductive ground conductors 716*a*, 716*b* (e.g., comprising one or more metals and/or alloys thereof). The signal conductor 712 extends in between the ground conductors 716*a*, 716*b*. In an example, each of the ground conductors 716*a*, 716*b* is in contact with a corresponding via 720, which is in contact with the upper conductive surface of the extension portion 112, while extending through the dielectric substrate 708.

In an example, the ground conductors 716*a*, 716*b* are on a first plane above the dielectric material of the board 122. The board 122 further includes a third ground conductor on a second plane below the dielectric material of the board 122. For example, the third ground conductor is between the board 122 and the extension portion 112. The third ground conductor, in an example, facilitates in grounding of the ground conductors 716*a*, 716*b* to a ground of the amplifier 120.

In an example, the amplifier 120 is grounded using any appropriate grounding arrangement, such that the upper surface of the extension portion 112 acts as a ground of the amplifier 120. The amplifier 120 may be grounded to the upper surface of the extension portion 112 through one or more connections that are on a bottom surface of the amplifier 120, in an example. In another example, the amplifier 120 may be grounded to the upper surface of the extension portion 112 through one or more wire bonded ribbons, or through the third ground conductor described above, although not illustrated in FIG. 7A.

The ground conductor 716*a* is circular or oval shaped, for example, and includes metal and/or metal alloy. A conductive via or pillar 720*a* (e.g., comprising metal and/or metal alloy) has (i) an upper portion extending through and in contact with the ground conductor 716*a*, (ii) an intermediate portion extending through the dielectric substrate 708, and (iii) a lower portion in contact with the upper surface of the extension portion 112. Thus, the ground conductor 716*a* is in contact with the upper surface of the extension portion 112 through the grounding via 720*a*, and hence, is in electrical contact with the ground of the amplifier 120. Note that the extension portion 112 and the structure 108 are a single conductive monolithic structure. Accordingly, the ground conductor 716*a* is direct current (DC) coupled to the structure 108 through the grounding via 720*a*.

Similarly, the ground conductor 716*b* is circular shaped or oval shaped, for example, and includes metal and/or metal alloy. A conductive via or pillar 720*b* (e.g., comprises metal and/or metal alloy) has (i) an upper portion extending through and in contact with the ground conductor 716*b*, (ii) an intermediate portion extending through the dielectric substrate 708, and (iii) a lower portion in contact with the upper surface of the extension portion 112. Thus, the ground conductor 716*b* is in contact with the upper surface of the extension portion 112 through the grounding via 720*b*, and hence, is in electrical contact with the ground of the amplifier 120. Note that the extension portion 112 and the structure 108 are a single conductive monolithic structure. Accordingly, the ground conductor 716*b* is DC coupled to the structure 108 through the grounding via 720*b*.

As described above, the board 122 has the RF signal line extending through the signal conductors 715 and 712, with the ground conductors 716*a* and 716*b* on two sides, thereby forming the grounded coplanar waveguide transition board, e.g., a waveguide that is coplanar (e.g., as the conductors 715, 712, 716*a*, 716*b* are on the same horizontal plane) and that guides the RF signal between the ground conductors 716*a*, 716*b*.

Note that the RF signal line and the ground connected vias 716*a*, 716*b* are DC shorted through the conductive structure 108. For RF signaling purposes, the hollow, conductive tube or cuboid of the structure 108 provides a waveguide transition structure. The sidewalls 305*a*, 305*b* of the structure 108 provide distributed inductance, while the empty space or cavity within the structure 108 provide distributed capacitance. The structure 108 acts as a conduit for transmission of RF electromagnetic energy, and acts as a director of the energy between the amplifier 120 and the aperture 116. In an example, during operation, the staircase shaped structure 304 facilitates mode transfer between the board 122 to the propagation mode of the structure 108.

Note that FIGS. 3A, 3B, and 7A illustrate the amplifier 120 on the extension portion 112, while FIGS. 4A, 4B, 6A, and 6B do not illustrate the amplifier 120. For example, FIGS. 4A and 4B illustrate a section 405 of the extension portion 112, on which the amplifier 120 is placed. In an example, the section 405 may be grooved or slotted (e.g., having an upper surface that is lower than an upper surface of a remaining section of the extension portion 112), to ensure a better fitting of the amplifier 120 within the section 405. The section 405 is illustrated as transparent in FIGS. 4A, 4B, and 6A, so that channels 322 within the extension portion are visible in these figures.

In one embodiment, one or more hollow channels 322 extend from a first side wall to a second sidewall of the extension portion 112, as illustrated in FIGS. 3A-7. Although two channels 322 are illustrated in FIGS. 3A-7, the extension portion 112 may have a higher (such as three, four, or higher) or a lower (such as one) number of such channels 322. In an example, during operation of the amplifier 120, the channels 322 transmit cooling fluid, to cool the amplifier 120 and carry away the heat generated by the amplifier 120 during operation.

As described above, in an example, the amplifier 120 can be a high power amplifier, e.g., if the aperture 116 acts as a transmit antenna. In another example, the amplifier 120 can be a low noise amplifier, e.g., if the aperture 116 acts as a receive antenna. As a high power amplifier may generate more heat than a low noise amplifier, the channels 322 may be present (or may be present with a higher number) if the amplifier 120 is a high power amplifier and the aperture 116 is a transmit antenna, in an example. In another example, the channels 322 may be absent (or may be present with a lower number) if the amplifier 120 is a low noise amplifier and the aperture 116 is a receive antenna. Thus, presence of the channels 322 and/or a number of channels 322 present in the extension portion 112 may be implementation specific.

Figure 7C:
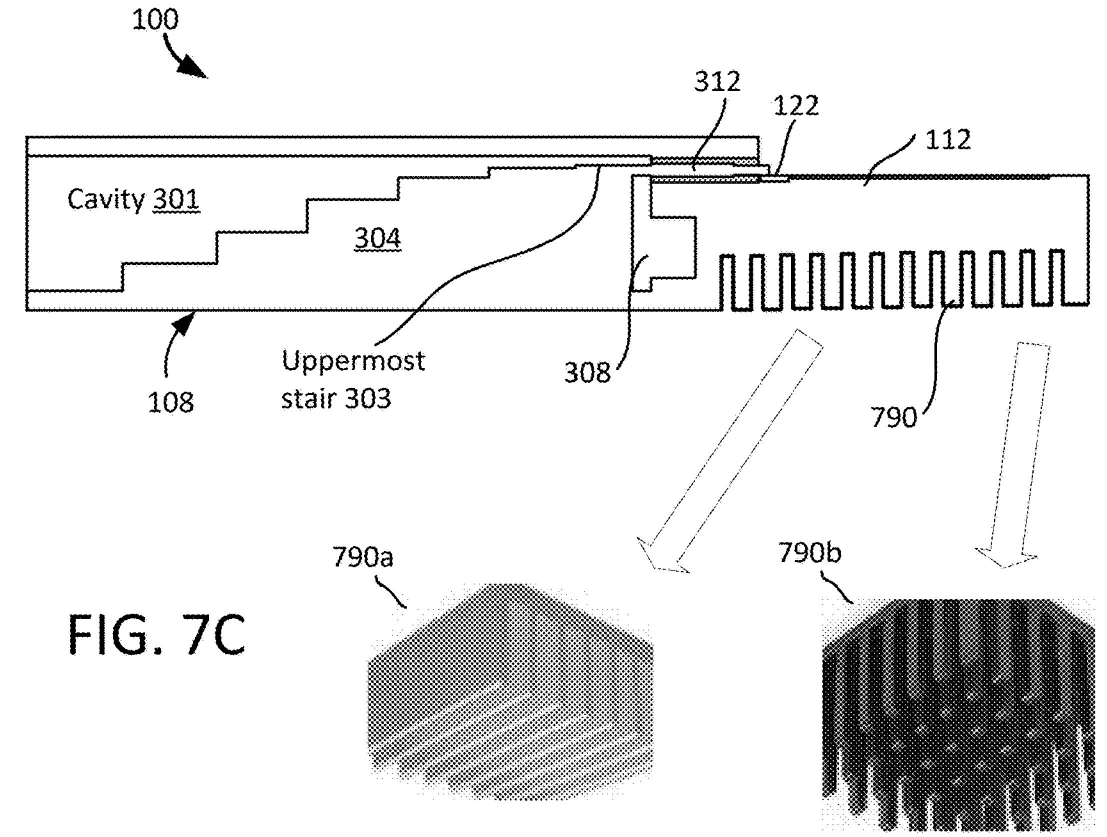
FIGS. 7C and 7D illustrate cross-sectional views of any of the antenna systems of FIGS. 1-7B, with thermal fins or pins for heat dissipation from the extension portion, in accordance with an embodiment of the present disclosure.

FIG. 7C illustrates a cross-sectional view of the structure 108 and the extension portion 112 of the antenna system 100 of FIG. 1 including thermal fins or pins 790 for heat dissipation from the extension portion 112, in accordance with an embodiment of the present disclosure. FIG. 7B illustrates a perspective view of the structure 108 and the extension portion 112 of the antenna system 200 of FIG. 2 including thermal fins or pins 790 for heat dissipation from the extension portion 112, in accordance with an embodiment of the present disclosure. Each of FIGS. 7C and 7D illustrates three-dimensional (3D) depiction of fins 790*a* that can be used for 790, and pins 790*b* that can be used for 790.

Figure 7D:
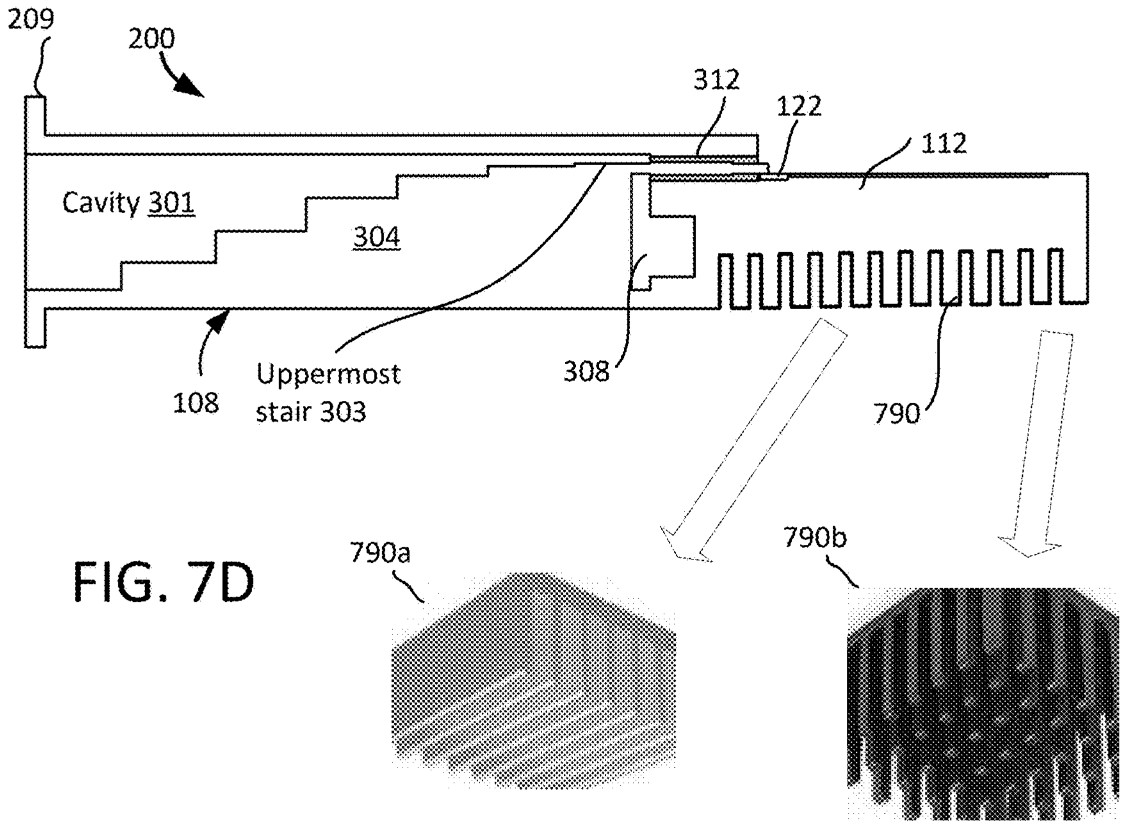

Thus, while some of FIGS. 3A-7B illustrate channels 322 within the extension portion 112 for colling the amplifier 120, FIGS. 7C and 7D illustrate the fins or pins 790 within the extension portion 112 for colling the amplifier 120. In an example, the fins or pins 790 increase a surface area of heat dissipating surface of the extension portion 112, which facilitates cooling the extension portion, and resultantly cooling the amplifier 120.

Figure 8:
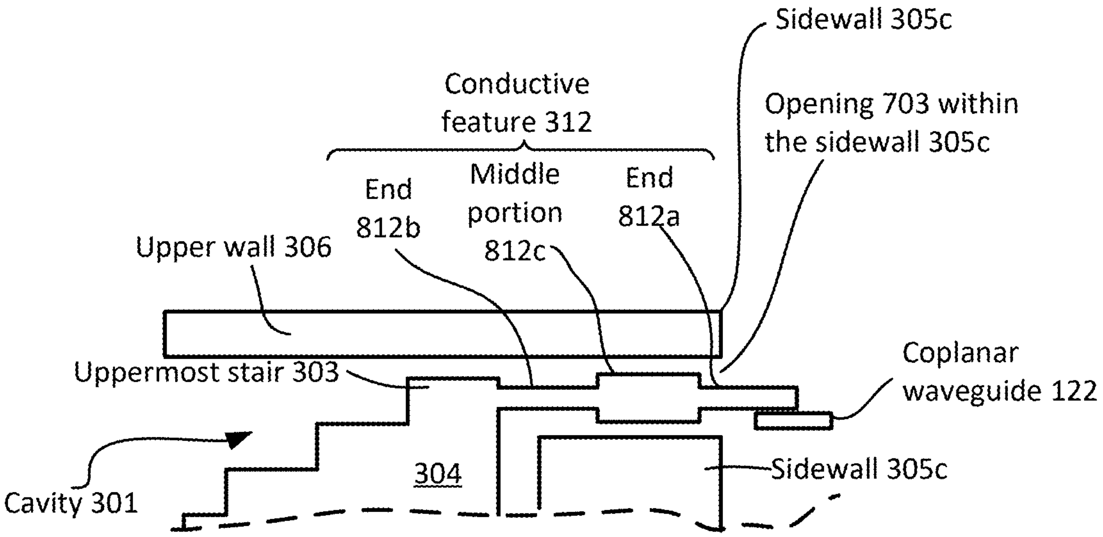
FIG. 8 illustrates a cross-sectional view of a stepped coaxial center conductor of the waveguide to coaxial transition structure, where the coaxial center conductor extends from an uppermost step of a staircase shaped structure of the waveguide to coaxial transition structure to above a grounded coplanar waveguide transition board on the extension portion, of any of the antenna systems of FIGS. 1-7, in accordance with an embodiment of the present disclosure.

FIG. 8 illustrates a cross-sectional view of the coaxial center conductor 312 of the structure 108, where the coaxial center conductor 312 extends from the uppermost stair 303 of the staircase shaped structure 304 of the structure 108 to above the board 122 on the extension portion 112, in accordance with an embodiment of the present disclosure. Note that the illustration of FIG. 8 focuses on the cross-sectional view of the coaxial center conductor 312, and omits details of one or more other components of the antenna system 100 or 200, such as doesn't illustrate the extension portion 112 and the recess 308, for example.

As illustrated, the coaxial center conductor 312 comprises a first end 812*a* above the board 122 (e.g., in contact with the board 122), and a second end 812*b* monolithic and continuous with the uppermost stair 303, and a middle portion 812*b* between the two end portions 812*a*, 812*b*. The coaxial center conductor 312 is, thus, monolithic and continuous with the uppermost stair 303. As illustrated, the end portion 812 extends through the opening 703 of the sidewall 305*c*, although in another example the middle portion 812*c* may instead extend through the opening 703 of the sidewall 305*c*.

In one embodiment, a diameter of the coaxial center conductor 312 varies along its length. For example, a diameter of the middle portion 812*c* is greater than a dimeter of each of the first and second ends 812*a*, 812*b*. The varying diameter of the coaxial center conductor 312 facilitates impedance transfer between the board 122 and the uppermost stair 303, in an example.

As described above, the coaxial center conductor 312 is a part of the structure 108, and is monolithic with the uppermost stair 303 (e.g., no interface between the end 812*b* of the coaxial center conductor 312 and the uppermost stair 303, and these components form a single integrated conductive structure). For example, the structure 108, including the coaxial center conductor 312, is manufactured additively, e.g., using a 3D printing process, which facilitates forming the varying diameter of the coaxial center conductor 312.

Methods of Manufacturing

Figure 9:
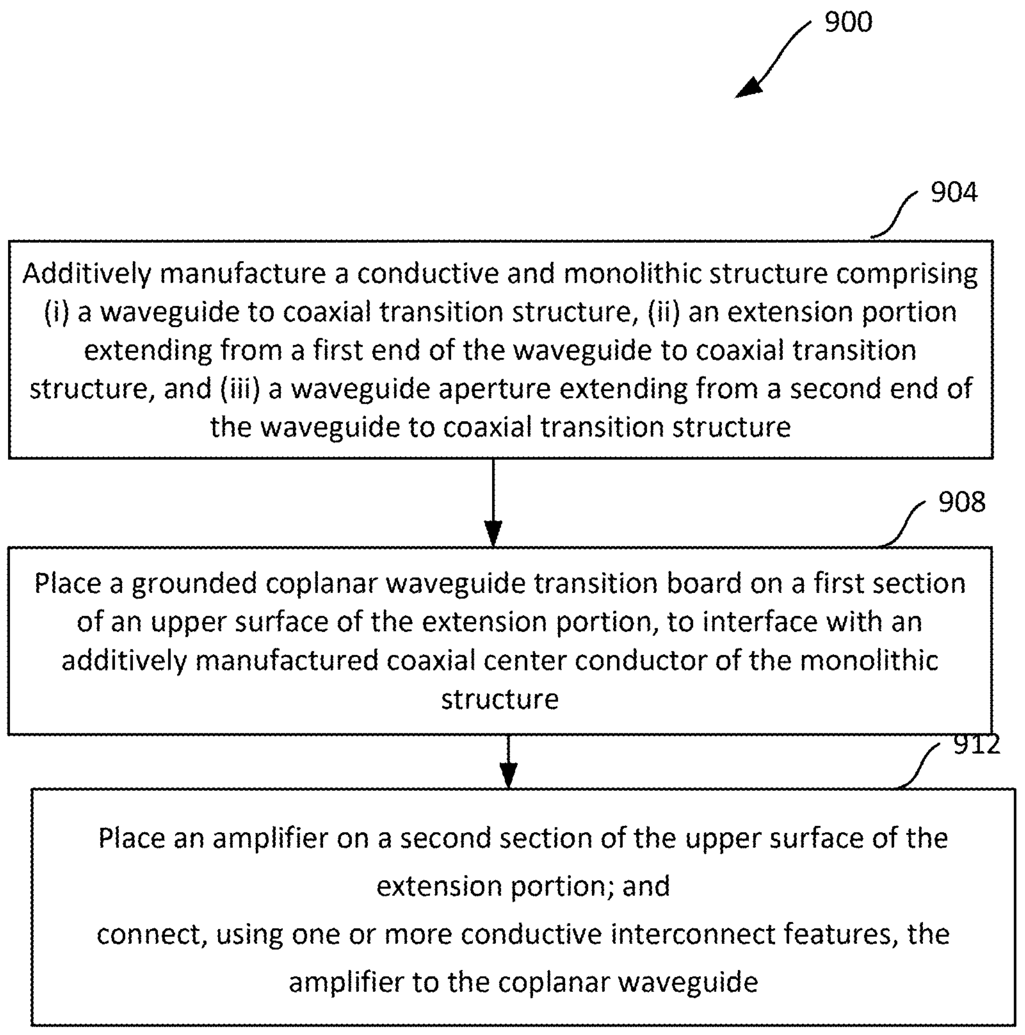
FIG. 9 illustrates a flowchart depicting a method of forming an example antenna assembly (such as the antenna system of FIGS. 1 and 3-8), in accordance with an embodiment of the present disclosure.
Figure 10A:
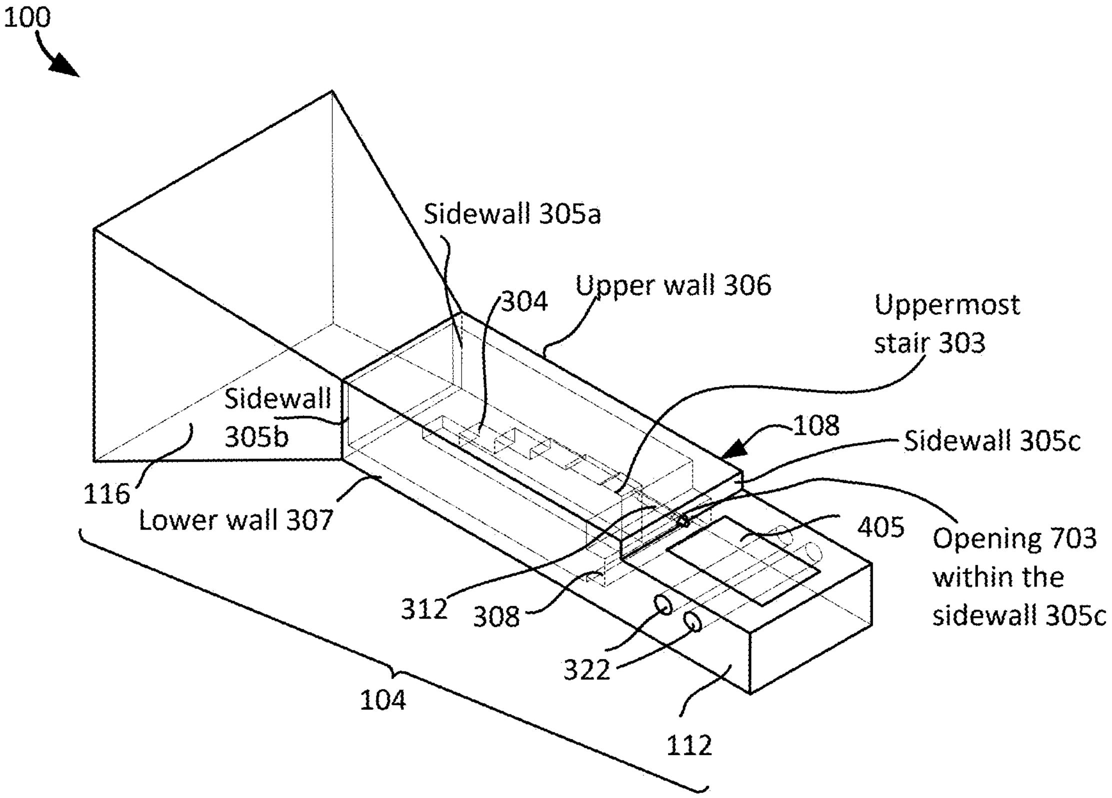
FIGS. 10A and 10B collectively illustrate an example antenna assembly in various stages of processing in accordance with the methodology of FIG. 9, in accordance with an embodiment of the present disclosure.
Figure 10B:
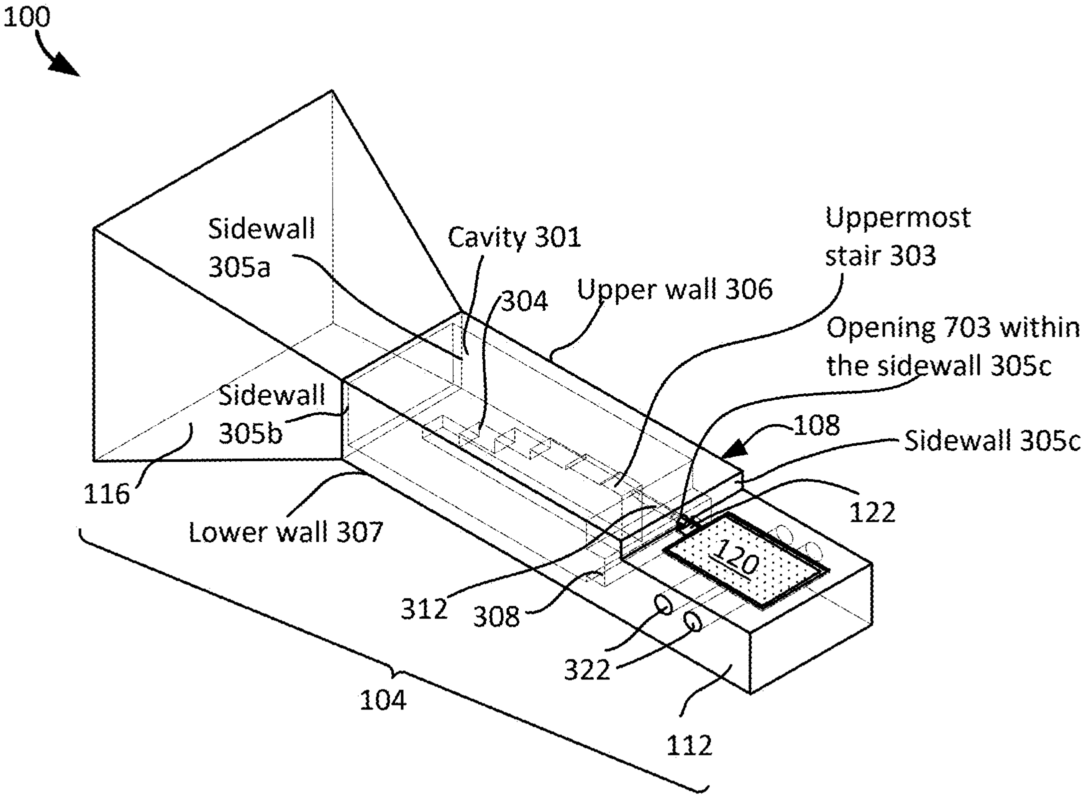

FIG. 9 illustrate a flowchart depicting a method 900 of forming an example antenna assembly (such as the antenna system 100 described above), in accordance with an embodiment of the present disclosure. FIGS. 10A and 10B collectively illustrate an example antenna assembly 100 in various stages of processing in accordance with the methodology 900 of FIG. 9, in accordance with an embodiment of the present disclosure. FIGS. 9 and 10A-10B will be discussed in unison.

Referring to the method 900 of FIG. 9, at 904, a conductive and monolithic structure 104 is additively manufactured, where the conductive and monolithic structure 104 comprises (i) a waveguide to coaxial transition structure 108, (ii) an extension portion 112 extending from a first end of the waveguide to coaxial transition structure 108, and (iii) a waveguide aperture 116 extending from a second end of the waveguide to coaxial transition structure 108, as illustrated in FIG. 10A.

In an example, additively manufacturing the structure 104 may include using any appropriate additive manufacturing techniques to form the structure 104. For example, additively manufacturing the structure 104 may include printing the structure 104 using a 3D printer. Additive manufacturing, such as 3D printing, uses computer-aided-design (CAD) software and/or 3D object scanners to direct hardware to deposit material, layer upon layer, in precise geometric shapes. As its name implies, additive manufacturing adds material to create an object. Thus, additive manufacturing involves a computer controlled process that creates 3D objects, such as the element, by depositing materials, usually in layers. Because the entire structure 104 is formed using the same additive manufacturing process, the structure 104 is monolithic, with no interface between two portions of the structure 104.

The method 900 proceeds from 904 to 908. At 908, a grounded coplanar waveguide transition board 122 is placed on a first section of an upper surface of the extension portion, to interface with an additively manufactured coaxial center conductor 312 of the monolithic structure, e.g., as illustrated in FIG. 10B. The board 122 has been described above, e.g., with respect to FIGS. 3A-7B, and specifically with respect to FIG. 7A. In an example, the board 122 comprises a layer of dielectric material (such as the substrate 708) above a first section of the upper surface of the extension portion 112, wherein a second section 405 of the upper surface of the extension portion 112 is configured for placement of the amplifier 120 thereon. In an example, the board 122 further comprises a conductive signal conductor, such as any of the signal conductors 712 and 715, above the layer of dielectric material. In an example, the signal conductor is for transmission of RF signals between the amplifier 120 and the coaxial center conductor 312 of the structure 108.

The method 900 proceeds from 908 to 912. At 912, an amplifier 120 is placed on a second section of the upper surface of the extension portion 112; and the amplifier 120 is connected, using one or more signal conductors (such as signal conductor 715), to the board 122, as also illustrated in FIG. 10B, and as described above with respect to FIG. 7A and various other figures.

Note that the processes in method 900 are shown in a particular order for case of description. However, one or more of the processes may be performed in a different order or may not be performed at all (and thus be optional), in accordance with some embodiments. Numerous variations on method 900 and the techniques described herein will be apparent in light of this disclosure.

Figure 11:
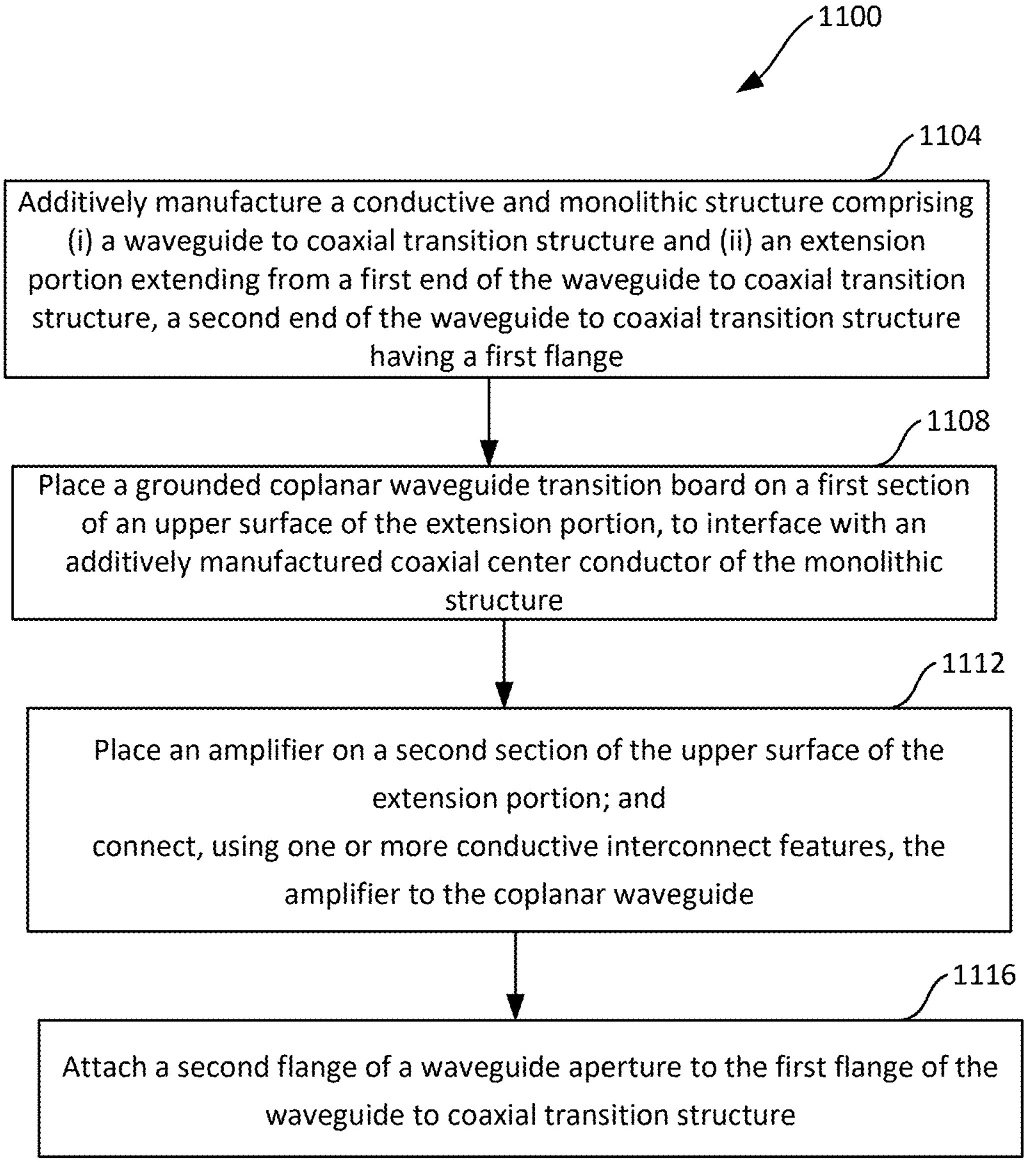
FIG. 11 illustrates a flowchart depicting a method of forming an example antenna assembly (such as the antenna system of FIG. 2-8), in accordance with an embodiment of the present disclosure.
Figure 12A:
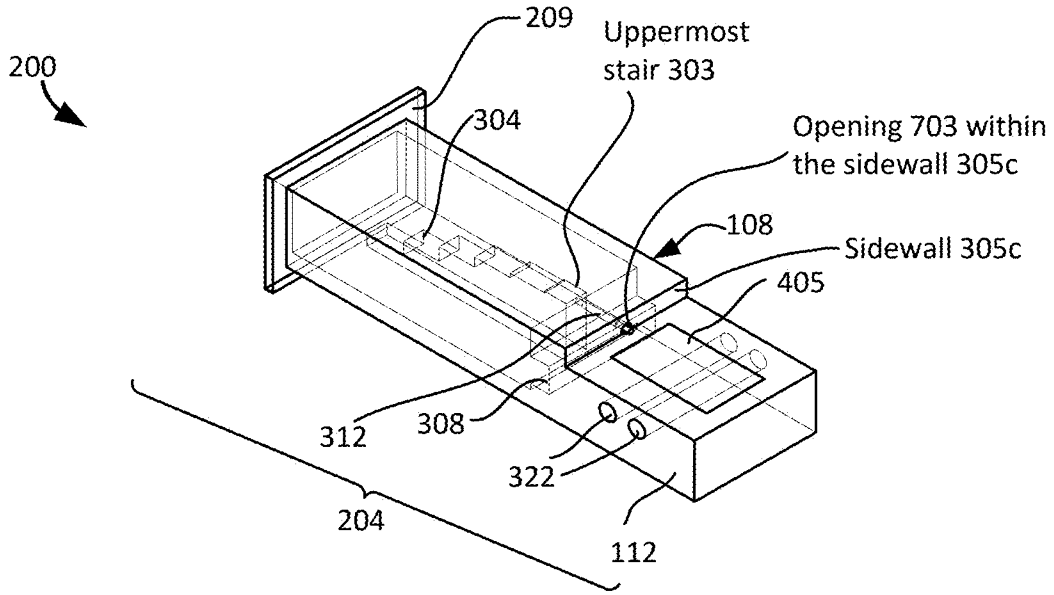
FIGS. 12A, 12B, and 12C collectively illustrate an example antenna assembly in various stages of processing in accordance with the methodology of FIG. 11, in accordance with an embodiment of the present disclosure.
Figure 12B:
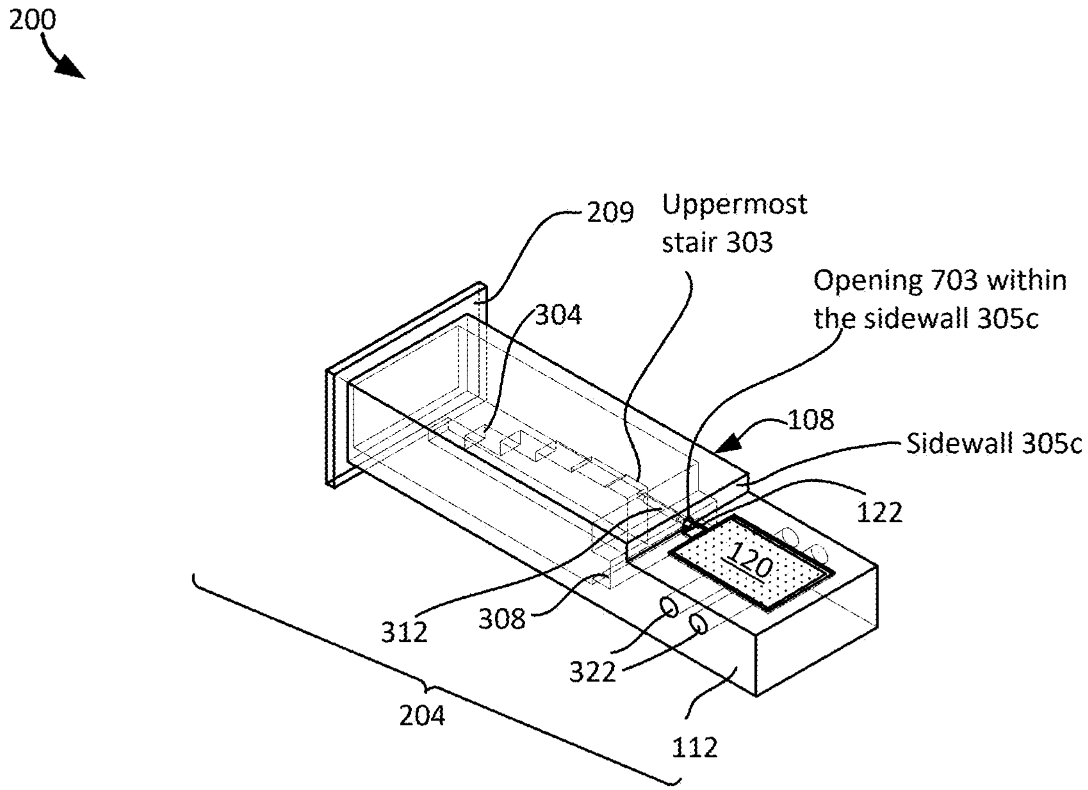
Figure 12C:
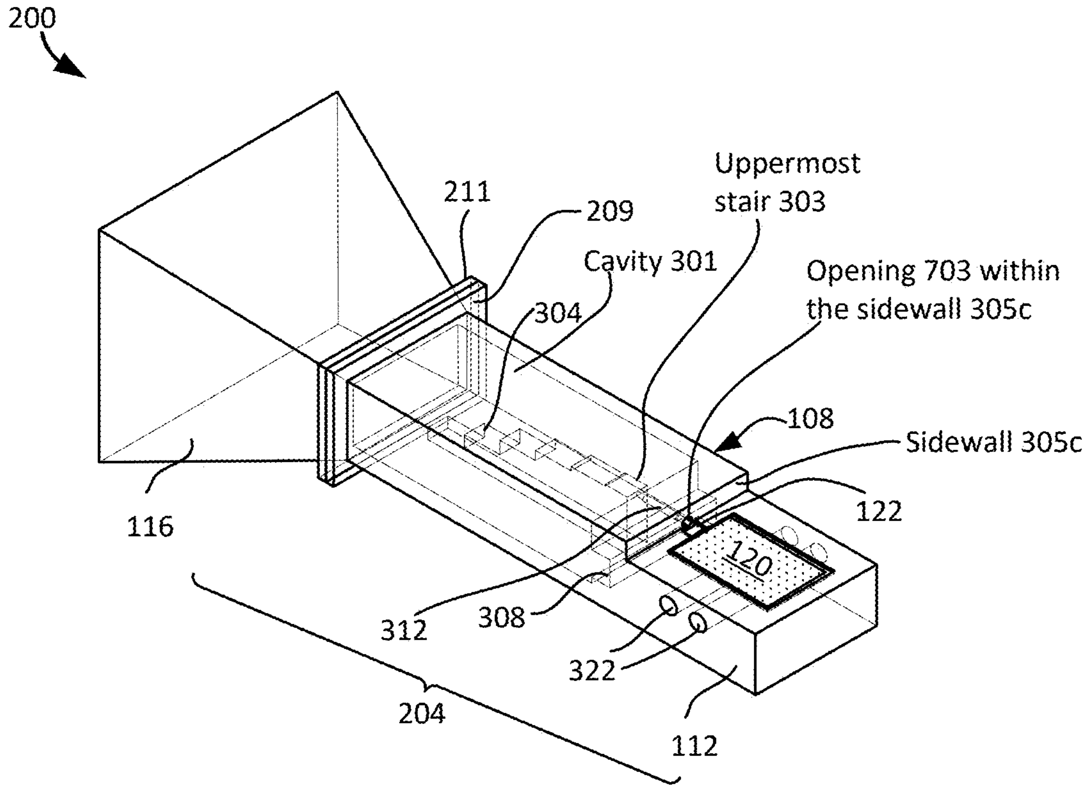

FIG. 11 illustrate a flowchart depicting a method 1100 of forming an example antenna assembly (such as the antenna system 200 described above), in accordance with an embodiment of the present disclosure. FIGS. 12A, 12B, and 12C collectively illustrate an example antenna assembly 200 in various stages of processing in accordance with the methodology 1100 of FIG. 11, in accordance with an embodiment of the present disclosure. FIGS. 11 and 12A-12C will be discussed in unison.

Referring to the method 1100 of FIG. 11, at 1104, a conductive and monolithic structure 204 is additively manufactured, where the conductive and monolithic structure 204 comprises (i) a waveguide to coaxial transition structure 108 and (ii) an extension portion 112 extending from a first end of the waveguide to coaxial transition structure, as illustrated in FIG. 12A. In an example, the structure 108 includes a first flange 209 on a second end of the structure 108, see FIG. 12A. In an example, additively manufacturing the structure 204 may include using any appropriate additive manufacturing techniques to form the structure 204, such as printing the structure 204 using a 3D printer.

The method 1100 then proceeds from 1104 to 1108. At 1108, a grounded coplanar waveguide transition board 122 is placed on a first section of an upper surface of the extension portion, to interface with an additively manufactured coaxial center conductor 312 of the monolithic structure, e.g., as illustrated in FIG. 12B. The board 122 has been described above, e.g., with respect to FIGS. 3A-7B, and specifically with respect to FIG. 7A.

The method 1100 then proceeds from 1108 to 1112. At 1112, an amplifier 120 is placed on a second section of the upper surface of the extension portion 112; and the amplifier 120 is connected, using one or more conductive signal conductors (such as signal conductor 715), to the board 122, as also illustrated in FIG. 12B, and as described above with respect to FIG. 7A and various other figures.

The method 1100 then proceeds from 1112 to 1116. At 1116, a second flange 211 of a waveguide aperture 116 is attached to the first flange 209 of the structure 108, as illustrated in FIG. 12C. For example, the flange 209 is monolithic with the structure 108, and the flange 211 is monolithic with the aperture 116. The flanges 211 and 209 are mechanically attached to each other via an appropriate attachment arrangement, such as one or more screws, or one or more nuts and bolts, for example.

Note that the processes in method 1100 are shown in a particular order for case of description. However, one or more of the processes may be performed in a different order or may not be performed at all (and thus be optional), in accordance with some embodiments. For example, process 1116 may be performed any time subsequent to the process 1104, and may be performed prior to or at least in part concurrently with processes 1108 and/or 1112. Numerous variations on method 1100 and the techniques described herein will be apparent in light of this disclosure.

FURTHER EXAMPLE EXAMPLES

The following examples pertain to further examples, from which numerous permutations and configurations will be apparent.

Example 1. A waveguide to coaxial transition structure comprising: a cavity defined by one or more walls and having a first opening at one end of the cavity and a second opening at an opposing end of the cavity; a staircase structure extending within the cavity between the first and second openings; and a coaxial center conductor extending from a last step of the staircase structure and out through the second opening of the cavity; and wherein the one or more walls, the staircase structure, and the coaxial center conductor are a continuous and monolithic body of conductive material.

Example 2. The waveguide to coaxial transition structure of example 1, comprising an aperture proximate the first opening.

Example 3. The waveguide to coaxial transition structure of example 2, wherein the aperture is also part of the continuous and monolithic body of conductive material.

Example 4. The waveguide to coaxial transition structure of any one of examples 2-3, wherein the aperture is attached to the continuous and monolithic body of conductive material via a flange.

Example 5. The waveguide to coaxial transition structure of any one of examples 1-4, wherein: the second opening extends through a sidewall of the one or more walls; the coaxial center conductor extends through the second opening, without contacting the sidewall, such that (i) the coaxial center conductor, (ii) a portion of the sidewall defining the second opening, and (iii) an air gap between the coaxial center conductor and the portion of the sidewall form a coaxial line structure.

Example 6. The waveguide to coaxial transition structure of any one of examples 1-5, wherein: an extension portion extends from below the second opening and under and past an end of the coaxial center conductor, the extension portion being part of the continuous and monolithic body of conductive material; and the extension portion comprises (i) a first section of an upper surface configured to receive a grounded coplanar waveguide transition board having a contact pad to which the end of the coaxial center conductor is to be connected, and (ii) a second section of the upper surface configured to receive an amplifier circuit.

Example 7. A waveguide to coplanar grounded waveguide transition structure comprising: the waveguide to coaxial transition structure of any one of examples 1-6; an extension portion extending from below the second opening and under and past an end of the coaxial center conductor, the extension portion being part of the continuous and monolithic body of conductive material; and a grounded coplanar waveguide transition board on a surface of the extension portion and having a contact pad to which the end of the coaxial center conductor is connected.

Example 8. The waveguide to coplanar grounded waveguide transition structure of example 7, wherein: the grounded coplanar waveguide transition board is on a first section of an upper surface of the extension portion, the first section laterally between a second section of the upper surface of the extension portion and the waveguide to coaxial transition structure; and the second section of the upper surface of the extension portion is configured to receive amplifier circuit that is connected to the contact pad.

Example 9. The waveguide to coplanar grounded waveguide transition structure of any one of examples 7-8, wherein the extension portion includes one or more coolant flow channels for circulating coolant to dissipate heat from a component on a surface of the extension portion.

Example 10. The waveguide to coplanar grounded waveguide transition structure of any one of examples 7-9, wherein the extension portion includes one or more fins or pins to facilitate heat dissipation from a component on a surface of the extension portion.

Example 11. The waveguide to coplanar grounded waveguide transition structure of any one of examples 7-10, wherein the extension portion includes a recess extending from the cavity toward the extension portion.

Example 12. The waveguide to coaxial transition structure of any one of examples 1-11, wherein the geometry of the coaxial center conductor is configured to provide impedance matching between the waveguide to coaxial transition structure and a circuit to which the waveguide to coaxial transition structure is connected.

Example 13. A method comprising: additively manufacturing a conductive and monolithic structure comprising a waveguide to coaxial transition structure, and an extension portion extending from an end of the waveguide to coaxial transition structure; forming a layer of dielectric material above a first section of an upper surface of the extension portion, wherein a second section of the upper surface of the extension portion is configured for placement of an amplifier thereon; and forming a signal conductor above the layer of dielectric material, the signal conductor for transmission of radio frequency signals between the amplifier and the waveguide to coaxial transition structure.

Example 14. The method of example 13, further comprising: placing the amplifier on the second section of the upper surface of the extension portion; and connecting, using another signal conductor, the amplifier to the signal conductor.

Example 15. The method of any one of examples 13-14, wherein the conductive and monolithic structure further comprises a waveguide aperture.

Example 16. An apparatus comprising: a waveguide to coaxial transition structure configured to transmit or receive a radio frequency signal; and an extension portion extending from an end of the waveguide to coaxial transition structure, wherein the waveguide to coaxial transition structure and the extension portion form a monolithic and continuous conductive structure; and wherein the extension portion is configured for placement of an amplifier thereon, for amplifying the radio frequency signal transmitted to or received from the waveguide to coaxial transition structure.

Example 17. The apparatus of example 16, wherein: the end of the waveguide to coaxial transition structure is a first end; and a second end of the waveguide to coaxial transition structure is configured to be in contact with a waveguide aperture.

Example 18. The apparatus of example 17, further comprising: the waveguide aperture, wherein the monolithic and continuous conductive structure comprising the waveguide to coaxial transition structure and the extension portion also includes the waveguide aperture.

Example 19. The apparatus of any one of examples 17-18, further comprising: the waveguide aperture, wherein the second end of the waveguide to coaxial transition structure has a first flange in contact with a second flange of the waveguide aperture.

Example 20. The apparatus of any one of examples 17-19, wherein the waveguide aperture is a waveguide fed horn aperture antenna.

Example 21. The apparatus of any one of examples 17-20, wherein at least one of: the waveguide aperture is a transmit antenna, the amplifier is a high power amplifier, and the radio frequency signal is transmitted from the amplifier to the waveguide aperture through the waveguide to coaxial transition structure; or the waveguide aperture is a receive antenna, the amplifier is a low noise amplifier, and the radio frequency signal is transmitted from the waveguide aperture to the amplifier through the waveguide to coaxial transition structure.

Example 22. The apparatus of any one of examples 16-21, wherein: an upper surface of the extension portion has (i) a first section for placement of the amplifier thereon, and (ii) a second section that is between the first section and the waveguide to coaxial transition structure; the apparatus further comprises (i) a dielectric material on the second section of the extension portion, and (ii) a first ground conductor, a second ground conductor, and a signal conductor between the first and second ground conductors on a first plane above the dielectric material, and (iii) a third ground conductor on a second plane below the dielectric material; and the first and second ground conductors and the signal conductor are on the dielectric material.

Example 23. The apparatus of example 22, wherein the signal conductor is wire bonded to the amplifier.

Example 24. The apparatus of any one of examples 16-23, the apparatus further comprises: a grounded coplanar waveguide transition board on an upper surface of the extension portion, and between the amplifier and the waveguide to coaxial transition structure; wherein the grounded coplanar waveguide transition board comprises a signal line extending laterally between a first ground connection and a second ground connection, the signal line to transmit the radio frequency signal between the waveguide to coaxial transition structure and the amplifier.

Example 25. The apparatus of any one of examples 16-24, wherein the waveguide to coaxial transition structure comprises: a lower wall; and a staircase structure comprising a plurality of stairs extending vertically upward from the lower wall, and extending horizontally along a length of the waveguide to coaxial transition structure, such that a lateral distance between an uppermost stair and the extension portion is less than another lateral distance between a lowermost stair and the extension portion.

Example 26. The apparatus of example 25, wherein the waveguide to coaxial transition structure further comprises: a sidewall facing the extension portion; and a coaxial center conductor having (i) a first end monolithic and continuous with the uppermost stair, (ii) a second end that is above the extension portion, and (iii) a middle portion between the first and second end portions, wherein the middle portion extends through an opening within the sidewall, without making contact with the sidewall, wherein a portion of the sidewall adjacent the opening, the coaxial center conductor, and an airgap between the portion of the sidewall and the coaxial center conductor, in combination, form a coaxial line.

Example 27. The apparatus of example 26, wherein a diameter of the coaxial center conductor changes along a length of the coaxial center conductor between the first and second ends.

Example 28. The apparatus of any one of examples 26-27, wherein: the coaxial center conductor has a first diameter at the first end; the coaxial center conductor has a second diameter at the second end; the coaxial center conductor has a third diameter at the middle portion, the third diameter greater than each of the first and second diameters.

Example 29. The apparatus of any one of examples 16-27, wherein: the extension portion includes (i) an upper surface configured for placement of the amplifier thereon, (ii) a first side surface extending from the upper surface, and (iii) a second side surface extending from the upper surface; and the extension portion further includes one or more openings extending from the first side surface to the second side surface, the one or more openings configured to transmit fluid usable for cooling of the amplifier.

Example 30. The apparatus of any one of examples 16-28, wherein: the extension portion includes (i) an upper surface configured for placement of the amplifier thereon, and (ii) a lower surface opposite the upper surface; and at least a part of the lower surface of the extension portion forms one or more fins or pins.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna systems 100 and/or 200.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A waveguide to coaxial transition structure comprising:

a cavity defined by one or more walls and having a first opening at one end of the cavity and a second opening at an opposing end of the cavity;

a staircase structure extending within the cavity between the first and second openings; and a coaxial center conductor extending from a last step of the staircase structure and out through the second opening of the cavity;

an extension portion extending from below the second opening and under and past an end of the coaxial center conductor, the extension portion being part of the continuous and monolithic body of conductive material; and a grounded coplanar waveguide transition board on a surface of the extension portion and having a contact pad to which the end of the coaxial center conductor is connected;

wherein the one or more walls, the staircase structure, and the coaxial center conductor are a continuous and monolithic body of conductive material.

2. The waveguide to coaxial transition structure of claim 1, comprising an aperture proximate the first opening.

3. The waveguide to coaxial transition structure of claim 2, wherein the aperture is also part of the continuous and monolithic body of conductive material.

4. The waveguide to coaxial transition structure of claim 2, wherein the aperture is attached to the continuous and monolithic body of conductive material via a flange.

5. The waveguide to coaxial transition structure of claim 1, wherein:

the second opening extends through a sidewall of the one or more walls;

the coaxial center conductor extends through the second opening, without contacting the sidewall, such that (i) the coaxial center conductor, (ii) a portion of the sidewall defining the second opening, and (iii) an air gap between the coaxial center conductor and the portion of the sidewall form a coaxial line structure.

6. The waveguide to coaxial transition structure of claim 1, wherein:

an extension portion extends from below the second opening and under and past an end of the coaxial center conductor, the extension portion being part of the continuous and monolithic body of conductive material; and the extension portion comprises (i) a first section of an upper surface configured to receive a grounded coplanar waveguide transition board having a contact pad to which the end of the coaxial center conductor is to be connected, and (ii) a second section of the upper surface configured to receive an amplifier circuit.

7. The waveguide to coplanar grounded waveguide transition structure of claim 1, wherein:

the grounded coplanar waveguide transition board is on a first section of an upper surface of the extension portion, the first section laterally between a second section of the upper surface of the extension portion and the waveguide to coaxial transition structure; and the second section of the upper surface of the extension portion is configured to receive amplifier circuit that is connected to the contact pad.

8. The waveguide to coplanar grounded waveguide transition structure of claim 1, wherein the extension portion includes one or more coolant flow channels for circulating coolant to dissipate heat from a component on a surface of the extension portion.

9. The waveguide to coplanar grounded waveguide transition structure of claim 1, wherein the extension portion includes one or more fins or pins to facilitate heat dissipation from a component on a surface of the extension portion.

10. The waveguide to coplanar grounded waveguide transition structure of claim 1, wherein the extension portion includes a recess extending from the cavity toward the extension portion.

11. The waveguide to coaxial transition structure of claim 1, wherein the geometry of the coaxial center conductor is configured to provide impedance matching between the waveguide to coaxial transition structure and a circuit to which the waveguide to coaxial transition structure is connected.

12. A method comprising:

additively manufacturing a conductive and monolithic structure comprising a waveguide to coaxial transition structure, and an extension portion extending from an end of the waveguide to coaxial transition structure;

forming a layer of dielectric material above a first section of an upper surface of the extension portion, wherein a second section of the upper surface of the extension portion is configured for placement of an amplifier thereon; and forming a signal conductor above the layer of dielectric material, the signal conductor for transmission of radio frequency signals between the amplifier and the wave-guide to coaxial transition structure;

wherein:

the upper surface of the extension portion has (i) a first section for placement of the amplifier thereon, and (ii) a second section that is between the first section and the waveguide to coaxial transition structure;

the conductive and monolithic structure further comprises (i) a first ground conductor, a second ground conductor, and a signal conductor between the first and second ground conductors on a first plane above the dielectric material, and (ii) a third ground conductor on a second plane below the dielectric material; and the first and second ground conductors and the signal conductor are on the dielectric material.

13. The method of claim 12, further comprising:

placing the amplifier on the second section of the upper surface of the extension portion; and connecting, using another signal conductor, the amplifier to the signal conductor.

14. The method of claim 12, wherein the conductive and monolithic structure further comprises a waveguide aperture.

15. An apparatus comprising:

a waveguide to coaxial transition structure configured to transmit or receive a radio frequency signal; and an extension portion extending from an end of the wave-guide to coaxial transition structure, wherein the waveguide to coaxial transition structure and the extension portion form a monolithic and continuous conductive structure; and wherein the extension portion is configured for placement of an amplifier thereon, for amplifying the radio frequency signal transmitted to or received from the waveguide to coaxial transition structure;

wherein:

an upper surface of the extension portion has (i) a first section for placement of the amplifier thereon, and (ii) a second section that is between the first section and the waveguide to coaxial transition structure;

the apparatus further comprises (i) a dielectric material on the second section of the extension portion, and (ii) a first ground conductor, a second ground conductor, and a signal conductor between the first and second ground conductors on a first plane above the dielectric material, and (iii) a third ground conductor on a second plane below the dielectric material; and the first and second ground conductors and the signal conductor are on the dielectric material.

16. The apparatus of claim 15, wherein:

the end of the waveguide to coaxial transition structure is a first end; and a second end of the waveguide to coaxial transition structure is configured to be in contact with a wave-guide aperture.

17. The apparatus of claim 16, wherein at least one of:

the waveguide aperture is a transmit antenna, the amplifier is a high power amplifier, and the radio frequency signal is transmitted from the amplifier to the wave-guide aperture through the waveguide to coaxial transition structure; or the waveguide aperture is a receive antenna, the amplifier is a low noise amplifier, and the radio frequency signal is transmitted from the waveguide aperture to the amplifier through the waveguide to coaxial transition structure.

18. The apparatus of claim 15, the apparatus further comprises:

a grounded coplanar waveguide transition board on an upper surface of the extension portion, and between the amplifier and the waveguide to coaxial transition structure;

wherein the grounded coplanar waveguide transition board comprises a signal line extending laterally between a first ground connection and a second ground connection, the signal line to transmit the radio frequency signal between the waveguide to coaxial transition structure and the amplifier.

* * * * *